US010692419B2

(12) United States Patent
Lin et al.

(10) Patent No.: US 10,692,419 B2
(45) Date of Patent: Jun. 23, 2020

(54) DISPLAY PANEL, DISPLAY DEVICE AND DISPLAY METHOD OF DISPLAY PANEL

(71) Applicant: Shanghai Tianma AM-OLED Co., Ltd., Shanghai (CN)

(72) Inventors: Jun Lin, Shanghai (CN); Shuang Cheng, Shanghai (CN); Lei Wen, Shanghai (CN); Honghu Ma, Shanghai (CN); Jinghua Niu, Shanghai (CN); Ping An, Shanghai (CN)

(73) Assignee: Shanghai Tianma AM-OLED Co., Ltd., Shanghai (CN)

( * ) Notice: Subject to any disclaimer, the term of this patent is extended or adjusted under 35 U.S.C. 154(b) by 0 days.

(21) Appl. No.: 16/410,569

(22) Filed: May 13, 2019

(65) Prior Publication Data

US 2020/0135086 A1 Apr. 30, 2020

(30) Foreign Application Priority Data

Oct. 31, 2018 (CN) .......................... 2018 1 1290091

(51) Int. Cl.
*G09G 3/20* (2006.01)
*G02B 5/30* (2006.01)
(Continued)

(52) U.S. Cl.
CPC ......... *G09G 3/2088* (2013.01); *G02B 5/3025* (2013.01); *G02B 27/0172* (2013.01);
(Continued)

(58) Field of Classification Search
CPC .............. G09G 3/2088; G09G 3/2003; G09G 2310/0264; G02B 5/3025; G02B 27/0172; G02B 2027/0178; H04N 13/344
See application file for complete search history.

(56) References Cited

U.S. PATENT DOCUMENTS

2007/0046607 A1* 3/2007 Lai ....................... G09G 3/3648
345/92
2013/0314515 A1* 11/2013 Shestak ................ H04N 13/315
348/57

FOREIGN PATENT DOCUMENTS

CN        102354701 A        2/2012
CN        102981339 A        3/2013
(Continued)

OTHER PUBLICATIONS

Chinese Office Action for application No. 201811290091.1; dated Jan. 20, 2020.

*Primary Examiner* — Abbas I Abdulselam
(74) *Attorney, Agent, or Firm* — Miller, Matthias & Hull LLP

(57) ABSTRACT

Provided are a display panel, a display device and a display method of the display panel. The display panel includes a pixel array, where the pixel array includes a plurality of pixel groups and each of the plurality of pixels group includes first-type pixel units and second-type pixel units; and a drive circuit configured to provide a drive signal for the pixel array. A display mode of the display panel includes a high-definition display mode in which within one-frame time, the first-type pixel units and the second-type pixel units collectively display a same to-be-displayed picture; a stereoscopic display mode in which the first-type pixel units display a user's left-eye picture within first time and the second-type pixel units display a user's right-eye picture within second time; and a power saving display mode in which the first-type pixel units display a picture and the second-type pixel units do not perform displaying.

20 Claims, 22 Drawing Sheets

(51) Int. Cl.
*H04N 13/344* (2018.01)
*G02B 27/01* (2006.01)
(52) U.S. Cl.
CPC ......... *G09G 3/2003* (2013.01); *H04N 13/344* (2018.05); *G02B 2027/0178* (2013.01); *G09G 2310/0264* (2013.01)

(56) References Cited

FOREIGN PATENT DOCUMENTS

CN 103702105 A 4/2014
CN 106200099 A 12/2016

\* cited by examiner

One frame    One frame    One frame    One frame

FIG. 20

DISPLAY PANEL, DISPLAY DEVICE AND DISPLAY METHOD OF DISPLAY PANEL

CROSS-REFERENCES TO RELATED APPLICATIONS

This application claims priority to a Chinese patent application No. 201811290091.1 filed on Oct. 31, 2018, the disclosure of which is incorporated herein by reference in its entirety.

TECHNICAL FIELD

The present disclosure relates to display techniques and, in particular, to a display panel, a display device and a display method of the display panel.

BACKGROUND

With the continuous development of display techniques, the display effect of a display device is transitioning from a two-dimensional display (plane display) to a stereoscopic display (three-dimensional (3D) display). Stereoscopic display techniques have become a new development trend of display techniques and increasingly more display devices begin to integrate the stereoscopic display techniques. The stereoscopic display techniques provide a stereoscopic display effect by generating parallax between the left eye and the right eye by use of a series of optical methods and combining pictures in the left eye and the right eye.

At present, according to its implementation principle, the 3D display can be divided into a color cast display, a polarized display and a shutter display. The color cast display may result in chromatic aberration due to incomplete color filtering and the display device has poor image sharpness. The polarized display halves the image resolution and the display device has a poor image display effect. The shutter display performs alternate high-frequency compression on dual pictures, with higher technical difficulties and costs.

SUMMARY

The present disclosure provides a display panel, a display device and a display method of the display panel to reduce technical difficulties and costs.

In a first aspect, the present disclosure provides a display panel. The display panel includes a pixel array and a drive circuit.

The pixel array includes a plurality of pixel groups.

Each of the plurality of pixel groups includes first-type pixel units and second-type pixel units.

The drive circuit is configured to provide a drive signal for the pixel array.

A display mode of the display panel includes:

a first display mode in which within one-frame time, first-type pixel units and second-type pixel units in the each of the plurality of pixel groups simultaneously receive the drive signal to collectively display a same to-be-displayed picture, and the display panel is in the first display mode;

a second display mode in which within one-frame time, the first-type pixel units in the each of the plurality of pixel groups receive the drive signal within first time to display a first picture and the second-type pixel units in the each of the plurality of pixel groups receive the drive signal within second time to display a second picture, where the second time lags behind the first time, the first picture is a user's left-eye picture, and the second picture is a user's right-eye picture; and the display panel is in the second display mode which is a stereoscopic display mode; and a third display mode in which within one-frame time, the first-type pixel units in the each of the plurality of pixel groups receive the drive signal to display a picture and the second-type pixel units do perform displaying; or the second-type pixel units in the each of the plurality of pixel groups receive the drive signal to display a picture and the first-type pixel units do not perform displaying; and the display panel is in the third display mode.

In a second aspect, the present disclosure further provides a display device including the display panel provided in the first aspect.

In a third aspect, the present disclosure further provides a display method of a display panel, which may be executed by the display panel provided in the first aspect. The display method includes the step described below.

First-type pixel units and second-type pixel units perform a display under drive of a drive circuit in any one of the following display manners:

a first display manner in which within one-frame time, the first-type pixel units and the second-type pixel units in a pixel group simultaneously receive a drive signal to collectively display a same to-be-displayed picture;

a second display manner in which within one-frame time, the first-type pixel units in the pixel group receive the drive signal within first time to display a first picture and the second-type pixel units in the pixel group receive the drive signal within second time to display a second picture; where the second time lags behind the first time, the first picture is a user's left-eye picture and the second picture is a user's right-eye picture; and a third display manner in which within one-frame time, the first-type pixel units in the pixel group receive the drive signal to display a picture and the second-type pixel units do not perform displaying; or the second-type pixel units in the pixel group receive the drive signal to display a picture and the first-type pixel units do not perform displaying.

The display panel provided by the present disclosure includes the pixel array and the drive circuit and it is set that the pixel group includes the first-type pixel units and the second-type pixel units so that each first-type pixel unit and each second-type pixel in the display panel may implement any one of the first display mode, the second display mode and the third display mode when being driven by the drive signal provided by the drive circuit. In the first display mode, within one-frame time, the first-type pixel units and the second-type pixel units in the pixel group simultaneously receive the drive signal to collectively display the same to-be-displayed picture so that the display panel may have more pixels per inch (PPI) and have a higher resolution, thereby achieving a high-definition display of a display picture. In the second display mode, within one-frame time, the first-type pixel units in the pixel group receive the drive signal within the first time to display the user's left-eye picture and the second-type pixel units in the pixel group receive the drive signal within the second time to display the user's right-eye picture, and the second time lags behind the first time so that a certain time difference exists between the picture displayed by the first-type pixel units and the picture displayed by the second-type pixel units, thereby facilitating a 3D display. Meanwhile, it is unnecessary to perform alternate high-frequency compression on the display picture of the same pixel unit, thereby reducing technical difficulties and costs. In the third display mode, within one-frame time, the first-type pixel units in the pixel group receive the drive signal to display the picture and the second-type pixel units do not perform displaying; or the second-type pixel units in the pixel group receive the drive signal to display the picture and the first-type pixel units do not perform displaying. In this mode, merely the first-type pixel units or merely the second-type pixel units in the display panel receive the drive signal to display the picture and the other type of pixel units does not work, which may reduce power consumption of the display panel and facilitate power saving and energy saving.

BRIEF DESCRIPTION OF DRAWINGS

FIG. 20 is a timing diagram of a drive signal in a third display manner of a display panel according to an embodiment of the present disclosure;

DETAILED DESCRIPTION

Figure 1:
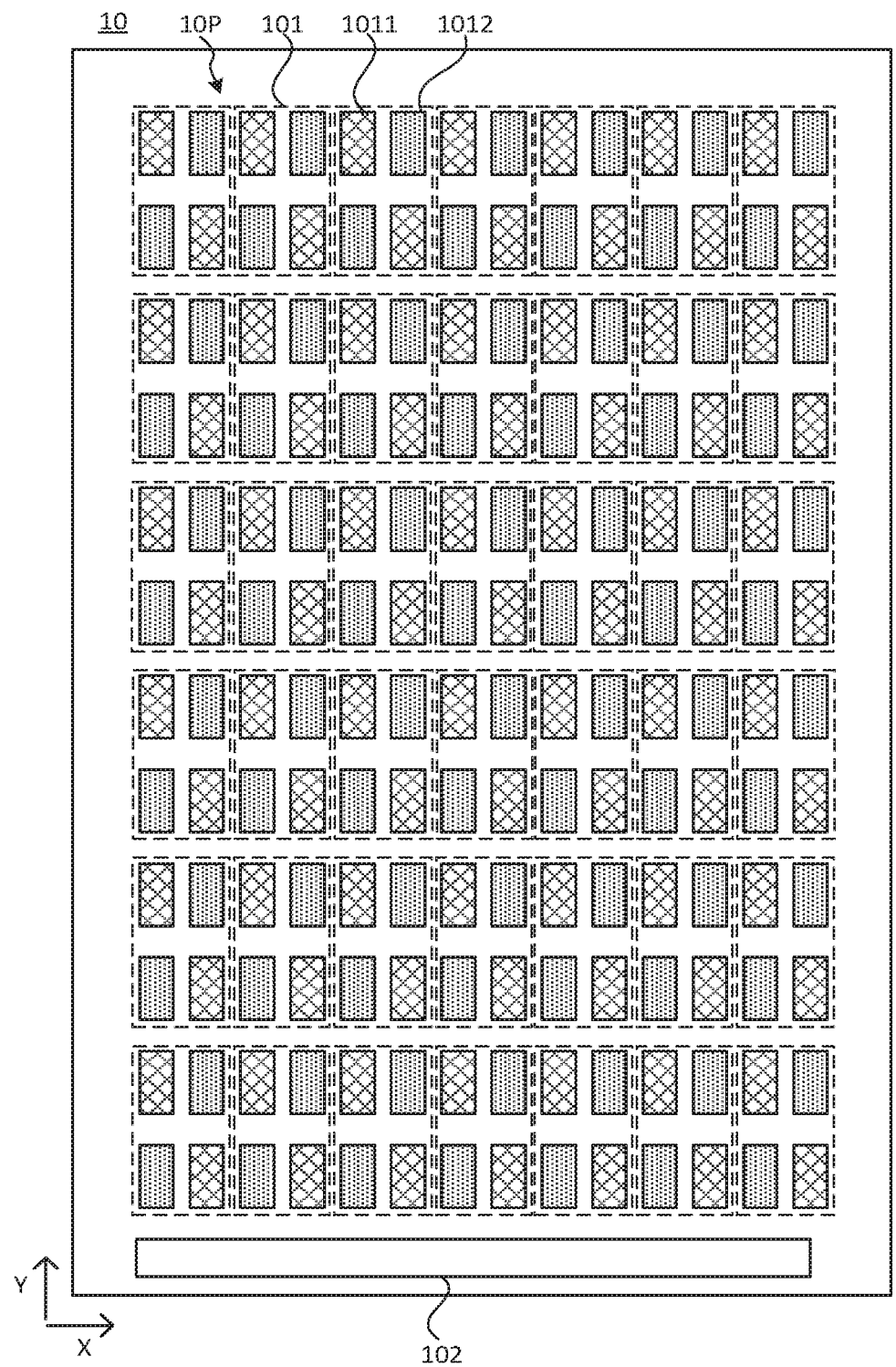
FIG. 1 is a structural diagram of a display panel according to an embodiment of the present disclosure.

Hereinafter the present disclosure will be further described in detail in conjunction with the drawings and embodiments. It should be understood that, the specific embodiments set forth below are merely intended to illustrate and not to limit the present disclosure. Additionally, it should be noted that, for ease of description, only part, not all, of the structures related to the present disclosure are illustrated in the drawings.

FIG. 1 is a structural diagram of a display panel according to an embodiment of the present disclosure. Referring to FIG. 1, a display panel 10 includes a pixel array 10P and a drive circuit 102. The pixel array 10P includes a plurality of pixel groups 101 and each pixel group 101 includes first-type pixel units 1011 and second-type pixel units 1012. The drive circuit 102 is configured to provide a drive signal for the pixel array 10P. A display mode of the display panel 10 includes a first display mode, a second display mode and a third display mode. In the first display mode, within one-frame time, first-type pixel units 1011 and second-type pixel units 1012 in the pixel group 101 simultaneously receive the drive signal to collectively display a same to-be-displayed picture, and the display panel 10 is in the first display mode. In the second display mode, within one-frame time, first-type pixel units 1011 in the pixel group 101 receive the drive signal within first time to display a first picture and second-type pixel units 1012 in the pixel group 101 receive the drive signal within second time to display a second picture within one frame, where the second time lags behind the first time, the first picture is a user's left-eye picture, and the second picture is a user's right-eye picture; and the display panel 10 is in the second display mode which is a stereoscopic display mode. In the third display mode, within one-frame time, first-type pixel units 1011 in the pixel group 101 receive the drive signal to display a picture and second-type pixel units 1012 do not perform displaying; or second-type pixel units 1012 in the pixel group 101 receive the drive signal to display a picture and first-type pixel units 1011 do not perform displaying; and the display panel 10 is in the third display mode.

The display panel 10 may display a picture when the drive circuit 102 provides the drive signal for the pixel array 10P. Exemplarily, the display panel 10 may be a light-emitting diode display panel, a liquid crystal display panel or other display panels known to those skilled in the art, which is not limited in the embodiments of the present disclosure.

The drive circuit 102 may include an integrated drive circuit, a flexible circuit board or other circuit structures known to those skilled in the art, which is not limited in the embodiments of the present disclosure.

The pixel group in the pixel array 10P includes the first-type pixel units 1011 and a second-type pixel units 1012, and the drive circuit 102 is configured to provide the drive signal for first-type pixel units 1011 and second-type pixel units 1012 in the pixel array 10P, which may enable the display mode of the display panel to include at least the first display mode, the second display mode and the third display mode.

Exemplarily, in the first display mode, within one-frame time, first-type pixel units 1011 and second-type pixel units 1012 in the pixel group 101 simultaneously receive the drive signal to collectively display the same to-be-displayed picture. In this display mode, each pixel unit in the display panel 10 (including each first-type pixel unit 1011 and each second-type pixel unit 1012) respectively corresponds to a pixel point at different positions of the same to-be-displayed picture so that the display panel 10 may have more pixels per inch and have a higher resolution, thereby achieving a high-definition display of a display picture of the display panel.

Exemplarily, in the second display mode, within one-frame time, first-type pixel units 1011 in the pixel group 101 receive the drive signal within the first time to display the user's left-eye picture and second-type pixel units 1012 in the pixel group 101 receive the drive signal within the second time to display the user's right-eye picture within one frame, and the second time lags behind the first time. At this time, the user's left-eye picture displayed by first-type pixel units 1011 may enter a left eye of a user, and the user's right-eye picture displayed by second-type pixel units 1012 may enter a right eye of the user. Meanwhile, a certain time difference exists between the picture displayed by the first-type pixel unit 1011 and the picture displayed by the second-type pixel unit 1012. The time difference is indistinguishable to the user's eyes and thus the user's left-eye picture and the user's right-eye picture are combined in the user's visual center to form a stereoscopic picture. In this display mode, the user's left-eye picture is displayed by the first-type pixel unit 1011 and the user's right-eye picture is displayed by the second-type pixel unit 1012. Therefore, it is unnecessary to perform alternate high-frequency compression on the display picture of the same pixel unit, thereby reducing technical difficulties and reducing costs of the display panel 10.

Exemplarily, in the third display mode, within one-frame time, first-type pixel units 1011 in the pixel group 101 receives the drive signal to display the picture and second-type pixel units 1012 second-type pixel units 1012 do not perform displaying; or second-type pixel units 1012 in the pixel group 101 receive the drive signal to display the picture and first-type pixel units 1011 do not perform displaying. In this display mode, the display panel 10 uses merely the first-type pixel unit 1011 or merely the second-type pixel unit 1012 for receiving the drive signal to display the picture and the other type of pixel units does not work, which is favorable to reduce power consumption of the display panel 10, thereby facilitating power saving and energy saving.

In addition, the display panel 10 may adopt different display modes to achieve the picture display according to different display requirements, which is implemented by a simple structure with a simple method.

It should be noted that, FIG. 1 merely exemplarily illustrate that the pixel array 10P includes six rows and seven columns of pixel groups 101, each pixel group 101 includes two first-type pixel units 1011 and two second-type pixel units 1012, and the first-type pixel unit 1011 is spaced apart from the second-type pixel unit 1012, but it is not to limit the display panel 10 according to the embodiments of the present disclosure. In other embodiments, the number of rows and the number of columns of the pixel groups 101 in the pixel array 10P and the numbers and arrangements of the first-type pixel unit 1011 and the second-type pixel unit 1012 in the pixel group 101 may be set according to practical requirements of the display panel 10, which are not limited in the embodiments of the present disclosure.

Figure 2:
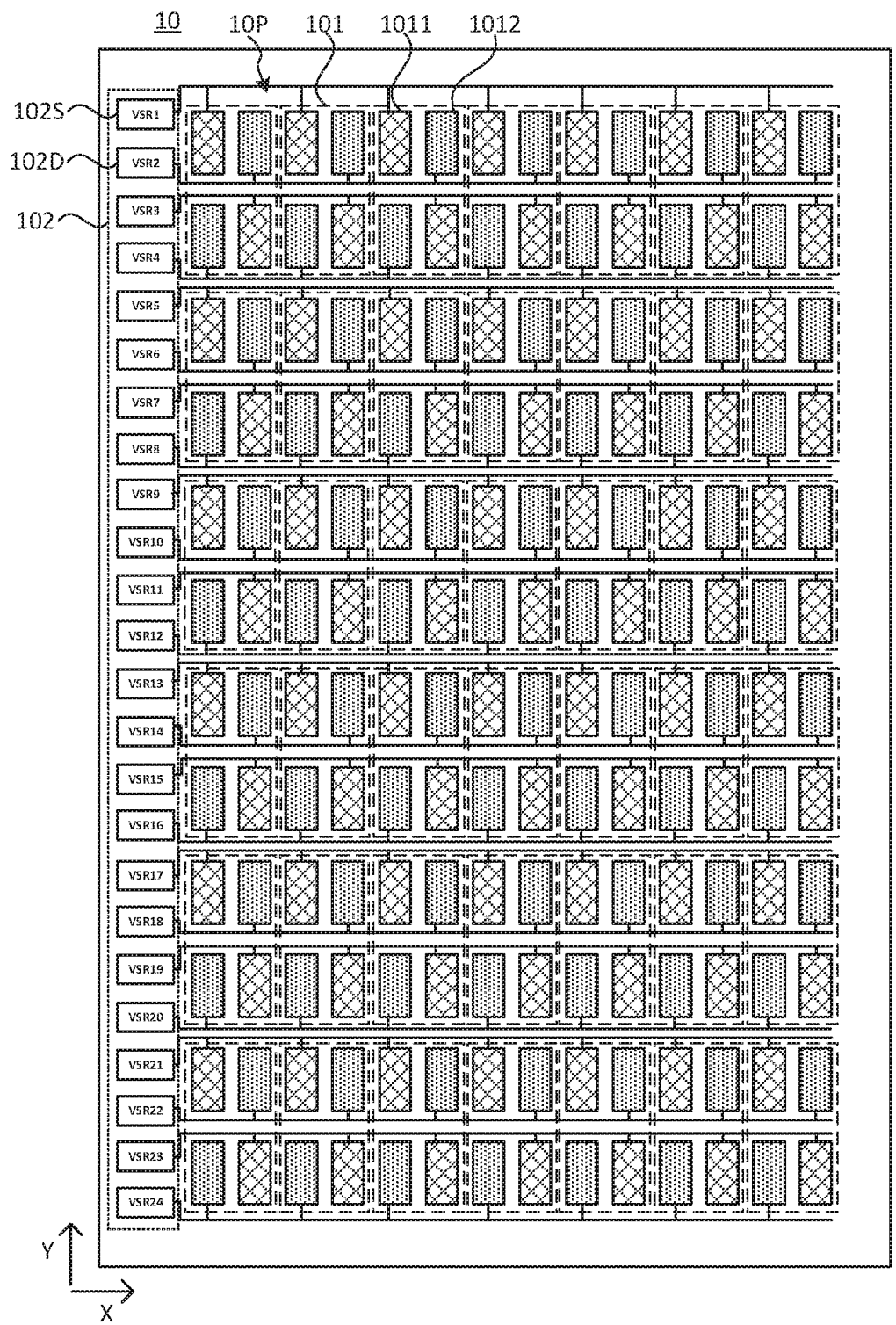
FIG. 2 is a structural diagram of another display panel according to an embodiment of the present disclosure.

Optionally, FIG. 2 is a structural diagram of another display panel according to an embodiment of the present disclosure. Referring to FIG. 2, the drive circuit 102 includes multi-stage shift register units connected in cascade. The first-type pixel unit 1011 is connected to a respective one of odd number-stage shift register units 102S in the multi-stage shift register units and the second-type pixel unit 1012 is connected to a respective one of even number-stage shift register units 102D in the multi-stage shift register units. In the first display mode, the multi-stage shift register units output the drive signal stage by stage. In the second display mode, the odd number-stage shift register units 102S in the multi-stage shift register units output the drive signal stage by stage within the first time and the even number-stage shift register units 102D output the drive signal stage by stage within the second time. In the third display mode, merely the odd number-stage shift register units 102S in the multi-stage shift register units output the drive signal stage by stage, or merely the even number-stage shift register units 102D output the drive signal stage by stage.

The shift register units may be electrically connected to the first-type pixel unit 1011 and the second-type pixel unit 1012 respectively through scanning lines for driving the pixel units row by row.

It should be understood that "outputting the drive signal row by row" here may include that each stage of shift register units drives the first-type pixel units 1011 and the second-type pixel units 1012 row by row, may also include that the odd number-stage shift register units 102S drive the first-type pixel unit 1011 row by row, and may further include the even number-stage shift register units 102D drive the second-type pixel units 1012 row by row.

Exemplarily, the odd number-stage shift register units 102S include a first shift register unit VSR1, a third shift register unit VSR3, a fifth shift register unit VSR5, a seventh shift register unit VSR7, a ninth shift register unit VSR9, an eleventh shift register unit VSR11, a thirteenth shift register unit VSR13, a fifteenth shift register unit VSR15, a seventeenth shift register unit VSR17, a nineteenth shift register unit VSR19, a twenty-first shift register unit VSR21 and a twenty-third shift register unit VSR23. The even number-stage shift register units 102D include a second shift register unit VSR2, a fourth shift register unit VSR4, a sixth shift register unit VSR6, an eighth shift register unit VSR8, a tenth shift register unit VSR10, a twelfth shift register unit VSR12, a fourteenth shift register unit VSR14, a sixteenth shift register unit VSR16, an eighteenth shift register unit VSR 18, a twentieth shift register unit VSR20, a twenty-second shift register unit VSR22 and a twenty-fourth shift register unit VSR24.

In the first display mode, the odd number-stage shift register units 102S and the even number-stage shift register units 102D are both used as a output terminal of the drive signal and output the drive signal to the pixel array 10P stage by stage. At this time, the drive signal is sequentially outputted stage by stage from the first shift register unit VSR1 to the twenty-fourth shift register unit VSR24, and each first-type pixel unit 1011 and each second-type pixel unit 1012 in the display panel 10 receive the drive signal and collectively display the same to-be-displayed picture. In this way, the display panel 10 may have more pixels per inch, thereby achieving the high definition display of the display picture of the display panel 10.

In the second display mode, within the first time, the odd number-stage shift register units 102S in the multi-stage shift register units output the drive signal stage by stage to drive the first-type pixel unit 1011 to display the user's left-eye picture; within the second time, the even number-stage shift register unit 102D in the multi-stage shift register units outputs the drive signal stage by stage to drive the second-type pixel unit 1012 to display the user's right-eye picture. At this time, the user's left-eye picture may enter the left eye of the user, and the user's right-eye picture may enter the right eye of the user, thereby achieving a stereoscopic display effect in the user's visual center. In this display mode, the odd number-stage shift register units 102S are adopted to drive the first-type pixel units 1011 to display the user's left-eye picture and the even number-stage shift register units 102D are adopted to drive the second-type pixel units 1012 to display the user's right-eye picture. It is unnecessary to perform the alternate high-frequency compression on the display picture of the same pixel unit, thereby reducing technical difficulties and reducing costs of the display panel 10.

In the third display mode, merely the odd number-stage shift register units 102S in the multi-stage shift register units outputs the drive signal stage by stage to drive the first-type pixel units 1011 to display the picture, and the even number-stage shift register units 102D do not outputdrive signal and the second-type pixel units 1012 do not performing displaying; or merely the even number-stage shift register units 102D output the drive signal stage by stage to drive the second-type pixel units 1012 to display the picture, and the odd number-stage shift register units 102S do not output drive signal and the first-type pixel units 1011 do not perform displaying. In this way, merely the first-type pixel units 1011 or merely the second-type pixel units 1012 are adopted to receive the drive signal and display the picture, and the other type of pixel units does not work, which is favorable to reduce the power consumption of the display panel 10, thereby facilitating power saving and energy saving.

Firstly, it should be noted that FIG. 2 only exemplarily illustrates that the number of stages of the shift register units is 24, which is set according to the structure of the pixel array 10P in FIG. 2, but it is not to limit the display panel 10 according to the embodiments of the present disclosure. In other embodiments, the number of levels of the shift register units may be set according to the practical requirements of the display panel 10, which is not limited in the embodiments of the present disclosure.

Secondly, it should be noted that FIG. 2 only exemplarily illustrates that the shift register units are merely disposed on one side of the pixel array 10P of the display panel 10, but it is not to limit the display panel 10 according to the embodiments of the present disclosure. In other embodiments, it may be set according to the practical requirements of the display panel 10 that the shift register units are disposed on both sides of the pixel array of the display panel. Of course, the shift register units may be disposed in other manners known to those skilled in the art. Meanwhile, a specific connection relationship between the first-type pixel units 1011 with the second-type pixel units 1012 and the shift register units may be set according to the distribution of the shift register units, which are not limited in the embodiments of the present disclosure.

In addition, it should be noted that the lines for cascading each stage of shift register units are not shown in FIG. 2 and those skilled in the art may understand that each stage of shift register units may be cascaded in any cascading manner known to those skilled in the art, which is not limited in the embodiments of the present disclosure.

Figure 3:
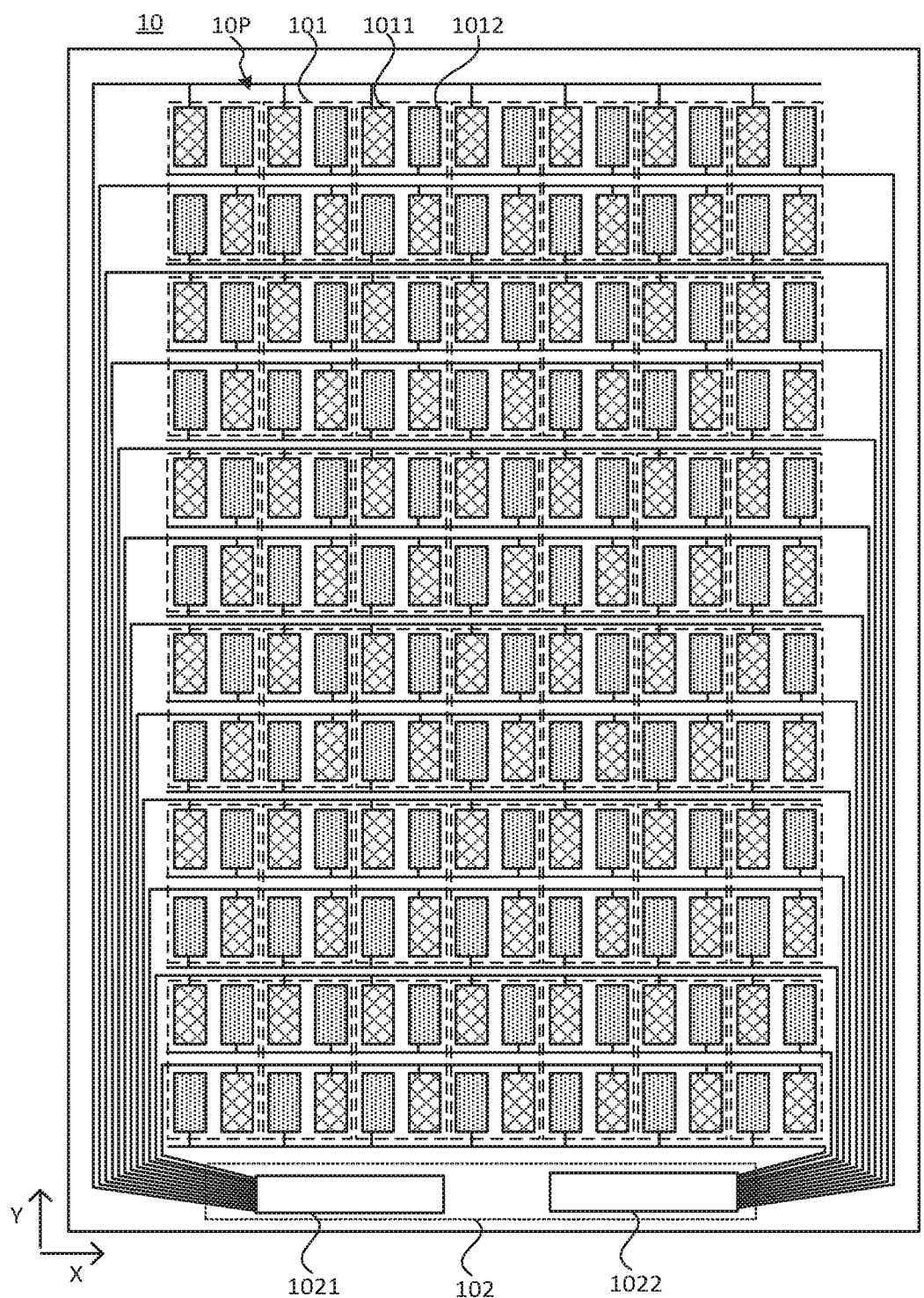
FIG. 3 is a structural diagram of yet another display panel according to an embodiment of the present disclosure.

Optionally, FIG. 3 is a structural diagram of yet another display panel according to an embodiment of the present disclosure. Referring to FIG. 3, the drive circuit 102 includes a first drive circuit 1021 and a second drive circuit 1022. The first drive circuit 1021 is connected to the first-type pixel units 1011 and provides the drive signal for the first-type pixel units 1011, and the second drive circuit 1022 is connected to the second-type pixel units 1012 and provides the drive signal for the second-type pixel units 1012.

The first drive circuit 1021 provides the drive signal for merely the first-type pixel units 1011, and the second drive circuit 1022 provides the drive signal for merely the second-type pixel units 1012. In this way, the drive circuits for the first-type pixel units 1011 and the second-type pixel units 1012 may be individually disposed so that the drive processes of the first-type pixel units 1011 and the second-type pixel units 1012 are independent of each other, thereby simplifying a drive algorithm of the drive circuit 102 and further reducing design difficulties of the display panel 10.

Firstly, it should be noted that FIG. 3 only exemplarily illustrates that the drive circuit 102 is disposed on one side of the pixel array 10P of the display panel 10. Specifically, the first drive circuit 1021 and the second drive circuit 1022 are disposed on the same side of the pixel array 10P, but it is not to limit the display panel 10 according to the embodiments of the present disclosure. In other embodiments, the first drive circuit 1021 and the second drive circuit 1022 may be disposed according to the practical requirements of the display panel 10, and the first drive circuit 1021 and the second drive circuit 1022 may be disposed on the same side of the pixel array 10P or different sides of the pixel array 10P, which is not limited in the embodiments of the present disclosure.

Secondly, it should be noted that FIG. 3 only exemplarily illustrates that the first drive circuit 1021 is respectively electrically connected to 12 rows of first-type pixels units 1011 arranged in a first direction X through 12 connection lines, and the second drive circuit 1022 is respectively electrically connected to 12 rows of second-type pixel units 1012 arranged in the first direction X through 12 connection lines, which is set according to the structure of the pixel array 10P in FIG. 3 and is not to limit the display panel 10 according to the embodiments of the present disclosure. In other embodiments, the number of connection lines for the first drive circuit 1021 and the second drive circuit 1022 may be set according to the practical requirements of the display panel 10, which is not limited in the embodiments of the present disclosure.

In addition, it should be noted that the drive circuit may further include a pixel drive circuit, and the pixel drive circuit may include a first pixel drive circuit and a second pixel drive circuit. The first pixel drive circuit is electrically connected in one-to-one correspondence to the first-type pixel unit 1011 and the second pixel drive circuit is electrically connected in one-to-one correspondence to the second-type pixel unit 1012. Those skilled in the art may understand that the display panel 10 may further include other structures known to those skilled in the art, which is not limited in the embodiments of the present disclosure.

Optionally, when the display panel 10 is in the second display mode, the first time is not overlapped with the second time.

The display panel 10 displays the user's left-eye picture using merely the first-type pixel unit 1011 within the first time, and the display panel 10 displays the user's right-eye picture using merely the second-type pixel unit 1012 within the second time. By setting that the first time does not overlap the second time, the time when the user's left-eye picture is displayed does not overlap the time when the user's right-eye picture is display so that picture interference is avoided due to the user's left-eye picture entering the right eye of the user or the user's right-eye picture entering the left eye of the user, thereby ensuring a better 3D display effect of the display panel 10.

It should be noted that, in the second display mode, the first time alternates with the second time and the first time is not overlapped with the second time, and a time interval between the first time and the second time is less than a time interval distinguishable by the user's eyes, thereby ensuring a smooth display of dynamic pictures of the display panel 10.

Optionally, with continued reference to any one of FIG. 1 to FIG. 3, the display mode of the display panel 10 further includes a fourth display mode. In the fourth display mode, within one-frame time, first-type pixel units 1011 in the pixel group 101 receive the drive signal merely within third time to display a picture and second-type pixel units 1012 second-type pixel units 1012 receive the drive signal merely within fourth time to display a picture. The third time alternates with the fourth time and the third time is not overlapped with the fourth time, and the display panel 10 is in the fourth display mode.

In this way, within one-frame time, first-type pixel units 1011 are merely adopted to display the picture within the third time and second-type pixel units 1012 are merely adopted to display the picture within the fourth time. Therefore, within one-frame time, the display panel 10 uses merely the first-type pixel units 1011 or merely the second-type pixel units 1012 for receiving the drive signal to display the picture and the other type of pixel units does not work. On one hand, it is favorable to reduce the power consumption of the display panel 10, thereby facilitating power saving and energy saving; and on the other hand, the requirements for the picture display are simultaneously allocated to the first-type pixel units 1011 and the second-type pixel units 1012 to balance losses of the first-type pixel units 1011 and the second-type pixel units 1012 in the display process so that the first-type pixel units 1011 and the second-type pixel units 1012 may have equal service lives, thereby enabling the display panel 10 to have a longer service life.

Meanwhile, it is set that the third time alternates with the fourth time and the third time does not overlap the fourth time to ensure that the picture displayed by the display panel 10 has uniform pixels per inch and higher smoothness.

Optionally, with continued reference to any one of FIG. 1 to FIG. 3, in the pixel array 10P, the plurality of pixel groups 101 are repeatedly arranged in the first direction X and a second direction Y, where the first direction X intersects the second direction Y.

In this way, when the pixel group 101 is adopted to from the pixel array 10P, the plurality of pixel groups 101 are repeatedly arranged in the first direction X and the second direction Y to design the pixel array 10P and reduce the design difficulties of the pixel array 10P, thereby reducing the overall design difficulty of the display panel 10.

It should be noted that FIG. 1 to FIG. 3 only exemplarily illustrate that the first direction X is perpendicular to the second direction Y, but it is not to limit the display panel 10 according to the embodiments of the present disclosure. In other embodiments, an intersection angle of the first direction X and the second direction Y may be set according to the practical requirements of the display panel 10, which is not limited in the embodiments of the present disclosure.

Figure 4:
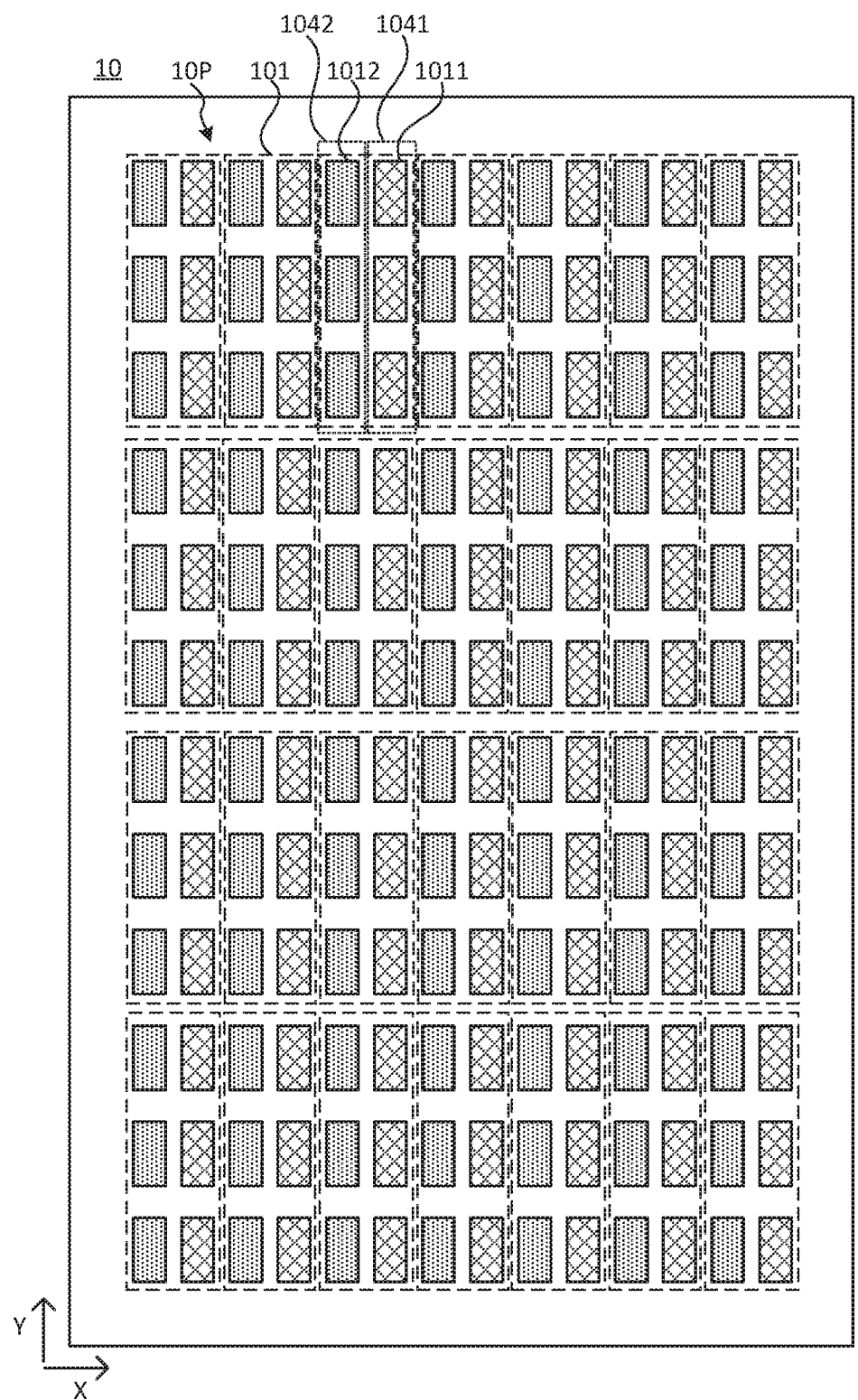
FIG. 4 is a schematic diagram illustrating an arrangement of a pixel array of a display panel according to an embodiment of the present disclosure.

Optionally, FIG. 4 is a schematic diagram illustrating an arrangement of a pixel array of a display panel according to an embodiment of the present disclosure. Referring to FIG. 4, the pixel group 101 includes a first pixel group 1041 and a second pixel group 1042. The first pixel group 1041 includes the first-type pixel units 1011, and the second pixel group 1042 includes the second-type pixel units 1012.

In this way, the first-type pixel units 1011 may be included in the first pixel group 1041 and the second-type pixel units 1012 may be included in the second pixel group 1042 to implement a grouping design of the first-type pixel units 1011 and the second-type pixel units 1012. Meanwhile, the first pixel group 1041 and the second pixel group 1042 are adopted to form the pixel group 101, and the plurality of pixel groups 101 are repeatedly arranged in the first direction X and the second direction Y to form the pixel array 10P, thereby simplifying the design of the pixel group 101 and the design of the pixel array 10P, and further reducing the overall design difficulty of the display panel 10.

It should be noted that FIG. 4 only exemplarily illustrates that each pixel group 101 includes one first pixel group 1041 and one second pixel group 1042 arranged in the first direction X, each first pixel group 1041 includes three first-type pixel units 1011 arranged in the second direction Y, and each second pixel group 1042 includes three second-type pixel units 1012 arranged in the second direction Y, but it is not to limit the display panel 10 according to the embodiments of the present disclosure. In other embodiments, the numbers and arrangements of the first pixel group 1041 and the second pixel group 1042 in the pixel group 101, the number and arrangement of the first-type pixel unit 1011 in the first pixel group 1041 and the number and arrangement of the second-type pixel unit 1012 in the second pixel group 1042 may be set according to the practical requirements of the display panel 10, which are not limited in the embodiments of the present disclosure.

Optionally, with continued reference to FIG. 4, in the pixel group 101, the first-type pixel unit 1011 includes first sub-pixels with N different emitting colors and the second-type pixel unit 1012 includes second sub-pixels with N different emitting colors, where N is a positive integer greater than or equal to 3 (exemplarily, N=3 in FIG. 4).

The first-type pixel units 1011 may be separately used for the picture display and the second-type pixel units 1012 may also be separately used for the picture display.

In this way, it is favorable to enable the first-type pixel unit 1011 to normally display a color picture and enable the second-type pixel unit 1012 to normally display the color picture. Exemplarily, when N=3 and the three different emitting colors are respectively red, green and blue, the display panel 10 may normally display the color picture.

It should be noted that "the first-type pixel unit 1011" and "the second-type pixel unit 1012" in the present application may be understood as a classification of sub-pixels in the pixel array 10P in the display panel 10. The first-type pixel unit 1011 may be understood as the sub-pixels being driven within a same time and illustrated by "the first sub-pixel" in the present application. The second-type pixel unit 1012 may be understood as the sub-pixels being simultaneously driven within another time and illustrated by "the second sub-pixel" in the present application. Whether the first-type pixel unit 1011 and the second-type pixel unit 1012 have a same drive time needs to be determined according to the display mode of the display panel 10 as detailed above.

In addition, those skilled in the art may understand that the N different emitting colors may be set according to the display requirements of the display panel 10, which is not limited in the embodiments of the present disclosure.

Optionally, with continued reference to FIG. 4, in the pixel group 101, the first pixel group 1041 is spaced apart from the second pixel group 1042 in the first direction X.

The first pixel group 1041 includes the first-type pixel units 1011 and first-type pixel units 1011 may be separately used for the picture display; and the second pixel group 1042 includes the second-type pixel units 1012 and second-type pixel units 1012 second-type pixel units 1012 may be separately used for the picture display. The first pixel group 1041 and the second pixel group 1042 in the pixel group 101 are spaced apart from each other in the first direction X so that the first-type pixel units 1011 and the second-type pixel units 1012 may be spaced apart from each other in the first direction X, which is favorable to achieve a uniform arrangement of the first-type pixel units 1011 in the pixel array 10P and a uniform arrangement of the second-type pixel units 1012 in the pixel array 10P. Therefore, when the display panel 10 is used for the picture display, a better picture display effect is achieved.

Exemplarily, 7 columns and 12 rows of first-type pixel units 1011 in FIG. 4 are uniformly arranged in the pixel array 10P, and 7 columns and 12 rows of second-type pixel units 1012 in FIG. 4 are uniformly arranged in the pixel array 10P. It may also be understood that an array of first-type pixel units 1011 is translated by a certain distance in the first direction X to obtain an array of second-type pixel units 1012. Therefore, when a same drive signal is provided, the first-type pixel units 1011 and the second-type pixel units 1012 may display a same picture, thereby ensuring the display effect of the display panel 10.

It should be noted that FIG. 4 only exemplarily illustrates that one row of first pixel groups 1041 and one row of second pixel groups 1042 are spaced apart from each other in the first direction X, but it is not to limit the display panel 10 according to the embodiments of the present disclosure. In other embodiments, it may be set according to the practical requirements of the display panel 10 that i lines of first pixel groups 1041 and j rows of second pixel groups 1042 are spaced apart from each other in the first direction X, where i and j are both an integer greater than or equal to 1 and a value of i may be equal to or different from a value of j, which are not limited in the embodiments of the present disclosure.

In addition, it should be noted that FIG. 4 merely exemplarily illustrates that the first pixel group 1041 includes three first-type pixel units 1011 and the second pixel group 1042 includes three second-type pixel units 1012, but the emitting colors of the first sub-pixel of the first-type pixel unit 1011 and the emitting colors of the second sub-pixel of the second-type pixel unit 1012 are not discussed in FIG. 4. The emitting colors of each sub-pixel (including the first sub-pixel and the second sub-pixel) are exemplarily described below.

Figure 5:
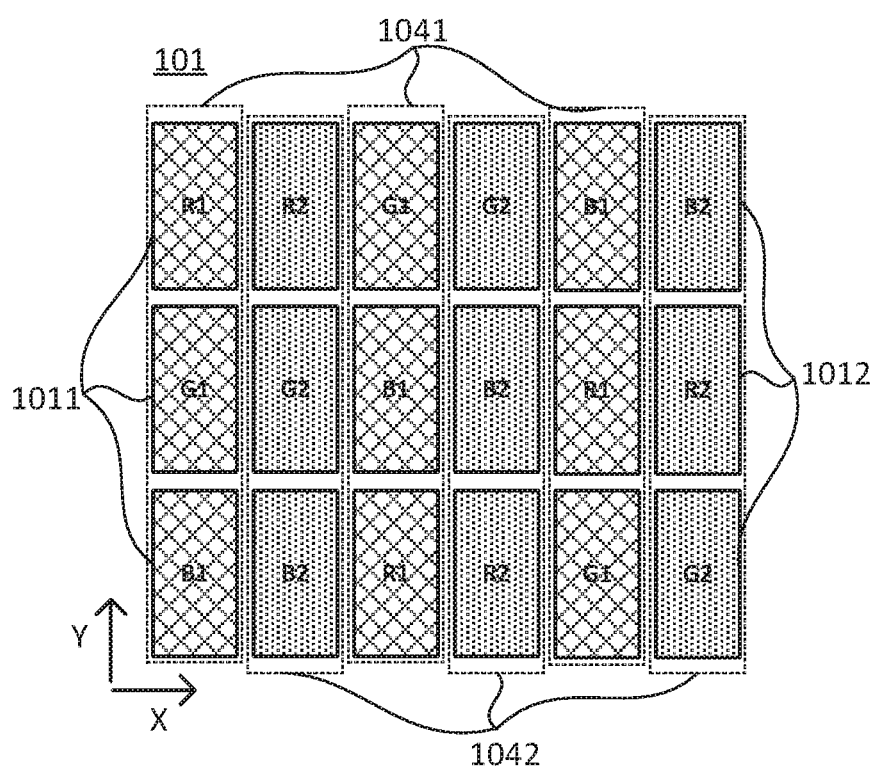
FIG. 5 is a schematic diagram illustrating an arrangement of another pixel array of a display panel according to an embodiment of the present disclosure.

Optionally, FIG. 5 is a schematic diagram illustrating an arrangement of another pixel array of a display panel according to an embodiment of the present disclosure. Referring to FIG. 5, the first pixel group 1041 includes first-type pixel units 1011 arranged in one row in the second direction Y and the first-type pixel units 1011 arranged in one row includes N (exemplary, N=3 in FIG. 5) first sub-pixels with N different emitting colors; the second pixel group 1042 includes second-type pixel units 1012 arranged in one row in the second direction Y, and the second-type pixel units arranged in one row 1012 includes N (exemplary, N=3 in FIG. 5) second sub-pixels with N different emitting colors.

The setting helps to achieve a color display and ensure a better picture display effect of the display panel.

Exemplarily, FIG. 5 illustrates one minimum repeating unit in the pixel array. The minimum repeating unit includes three pixel groups 101 arranged in the first direction X, and each pixel group 101 includes one first pixel group 1041 and one second pixel group 1042. The first pixel group 1041 includes three first sub-pixels with three different emitting colors which are respectively a first red sub-pixel R1, a first green sub-pixel G1 and a first blue sub-pixel B1, and the second pixel group 1042 includes three second sub-pixels with three different emitting colors, which are respectively a second red sub-pixel R2, a second green sub-pixel G2 and a second blue sub-pixel B2. In the minimum repeating unit illustrated in FIG. 5, the sub-pixels are arranged in the following manner:

R1 R2 G1 G2 B1 B2
G1 G2 B1 B2 R1 R2
B1 B2 R1 R2 G1 G2

The minimum repeating unit is repeatedly arranged in the first direction X and the second direction Y to form the pixel array.

In the pixel array formed by the minimum repeating unit, each row of sub-pixels in the first direction X includes the red sub-pixel, the green sub-pixel and the blue sub-pixel; and each row of sub-pixels in the second direction Y includes the red sub-pixel, the green sub-pixel and the blue sub-pixel. Therefore, the display effect of the display panel 10 may be improved.

Optionally, with continued reference to FIG. 5, in the first direction X, the first sub-pixel has a same emitting color as the second sub-pixel adjacent to the first sub-pixel, two adjacent first sub-pixels have different emitting colors, and two adjacent second sub-pixels have different emitting colors.

Exemplarily, in the first direction X, the first red sub-pixel R1 is disposed adjacent to the second red sub-pixel R2, the first green sub-pixel G1 is disposed adjacent to the second green sub-pixel G2, and the first blue sub-pixel B1 is disposed adjacent to the second blue sub-pixel B2. In this way, for an organic light emitting diode (OLED) display panel, in the manufacturing process, a same mask opening may be adopted to synchronously form the adjacent first sub-pixel and second sub-pixel with the same emitting color, thereby improving the mask opening, reducing design difficulties and manufacturing difficulties of the mask, and reducing manufacturing costs of the display panel 10.

Exemplarily, in the minimum repeating unit illustrated in FIG. 5, the first sub-pixels are arranged in the following manner:

R1 G1 B1
G1 B1 R1
B1 R1 G1

The second sub-pixels are arranged in the following manner:

R2 G2 B2
G2 B2 R2
B2 R2 G2

Therefore, the first sub-pixels and the second sub-pixels have the same color arrangement manner so that the first-type pixel unit 1011 and the second-type pixel unit 1012 may be adopted to display the same picture, thereby ensuring better picture display effects of the display panel 10 in the third display mode and the fourth display mode.

In addition, two adjacent first sub-pixels have different emitting colors and two adjacent second sub-pixels have different emitting colors to avoid disposing the sub-pixels with the same emitting color in a large area, thereby increasing the pixels per inch of the display panel 10 and ensuring the display effect of a high-definition picture of the display panel 10.

Figure 6:
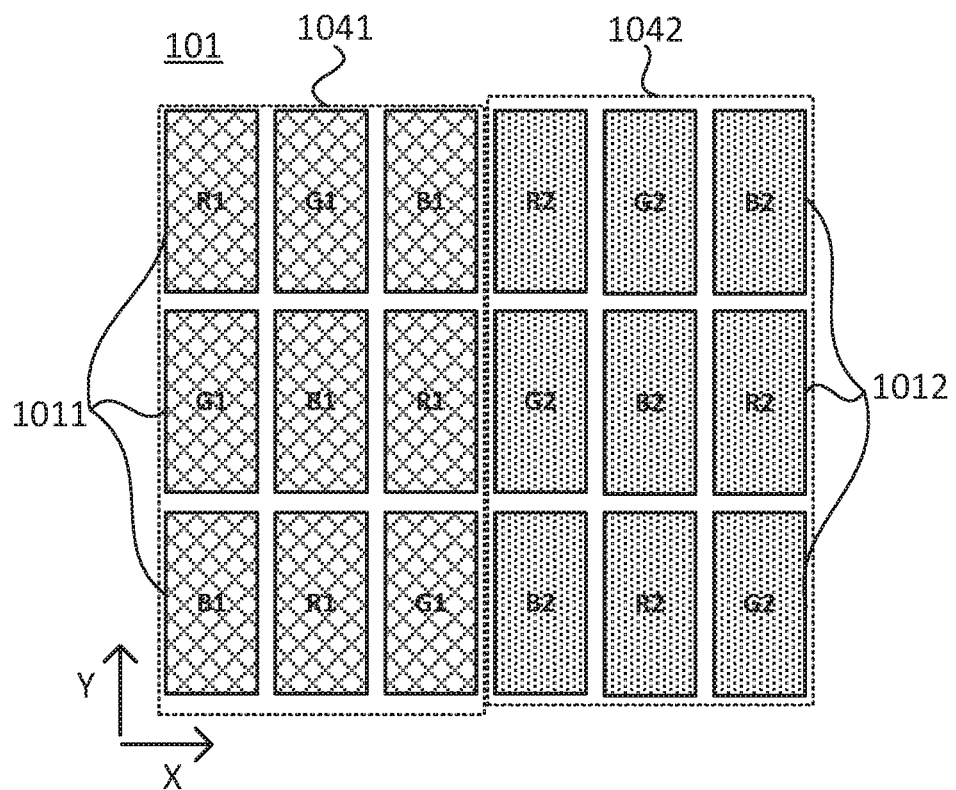
FIG. 6 is a schematic diagram illustrating an arrangement of yet another pixel array of a display panel according to an embodiment of the present disclosure.

Optionally, FIG. 6 is a schematic diagram illustrating an arrangement of yet another pixel array of a display panel according to an embodiment of the present disclosure. Referring to FIG. 6, in the pixel group 101, the first pixel group 1041 includes first-type pixel units 1011 arranged in N rows (exemplary, N=3 in FIG. 6) in the second direction Y and each row of first-type pixel units among the first-type pixel units 1011 arranged in N rows includes the first sub-pixels with N different emitting colors; the second pixel group 1042 includes second-type pixel units 1012 arranged in N rows (exemplary, N=3 in FIG. 6) in the second direction Y, and each row of second-type pixel units among the second-type pixel units 1012 arranged in N rows includes the second sub-pixels with N different emitting colors.

In this way, the first-type pixel units 1011 may be distributed in a relatively concentrated manner and the second-type pixel units 1012 may be distributed in a relatively concentrated manner, thereby facilitating a wiring design and reducing wiring difficulties.

Exemplarily, FIG. 6 illustrates one minimum repeating unit in the pixel array. The minimum repeating unit includes one pixel group 101, and the pixel group 101 includes one first pixel group 1041 and one second pixel group 1042 arranged in the first direction X. The first pixel group 1041 includes first-type pixel units 1011 arranged in three rows in the second direction Y and each row of first-type pixel units 1011 includes three first sub-pixels with three different emitting colors which are respectively the first red sub-pixel R1, the first green sub-pixel G1 and the first blue sub-pixel B1. The second pixel group 1042 includes second-type pixel units 1012 arranged in three rows in the second direction Y and each row of second-type pixel units 1012 includes three second sub-pixels with three different emitting colors, which are respectively the second red sub-pixel R2, the second green sub-pixel G2 and the second blue sub-pixel B2. In the minimum repeating unit illustrated in FIG. 6, the sub-pixels are arranged in the following manner:
R1 G1 B1 R2 G2 B2
G1 B1 R1 G2 B2 R2
B1 R1 G1 B2 R2 G2

The minimum repeating unit is repeatedly arranged in the first direction X and the second direction Y to form the pixel array.

In the pixel array formed by the minimum repeating unit, each row of sub-pixels in the first direction X includes the red sub-pixel, the green sub-pixel and the blue sub-pixel; and each row of sub-pixels in the second direction Y includes the red sub-pixel, the green sub-pixel and the blue sub-pixel. Therefore, the display effect of the display panel 10 may be improved.

Optionally, with continued reference to FIG. 6, in the first direction X, two adjacent sub-pixels have different emitting colors and the sub-pixels include the first sub-pixel and the second sub-pixel.

In the first direction X, two adjacent first sub-pixels have different emitting colors, two adjacent second sub-pixels have different emitting colors, and the first sub-pixel has different emitting colors from the second sub-pixel adjacent to the first sub-pixel. In this way, the display panel 10 may have more pixels per inch, thereby achieving a finer display effect of the display panel 10.

It should be noted that FIG. 5 and FIG. 6 only exemplarily illustrate that the first pixel group 1041 and the second pixel group 1042 are spaced apart from each other in the first direction X, but it is not to limit the display panel 10 according to the embodiments of the present disclosure. In other embodiments, the first pixel group 1041 and the second pixel group 1042 may also be spaced apart from each other in the second direction Y.

Figure 7:
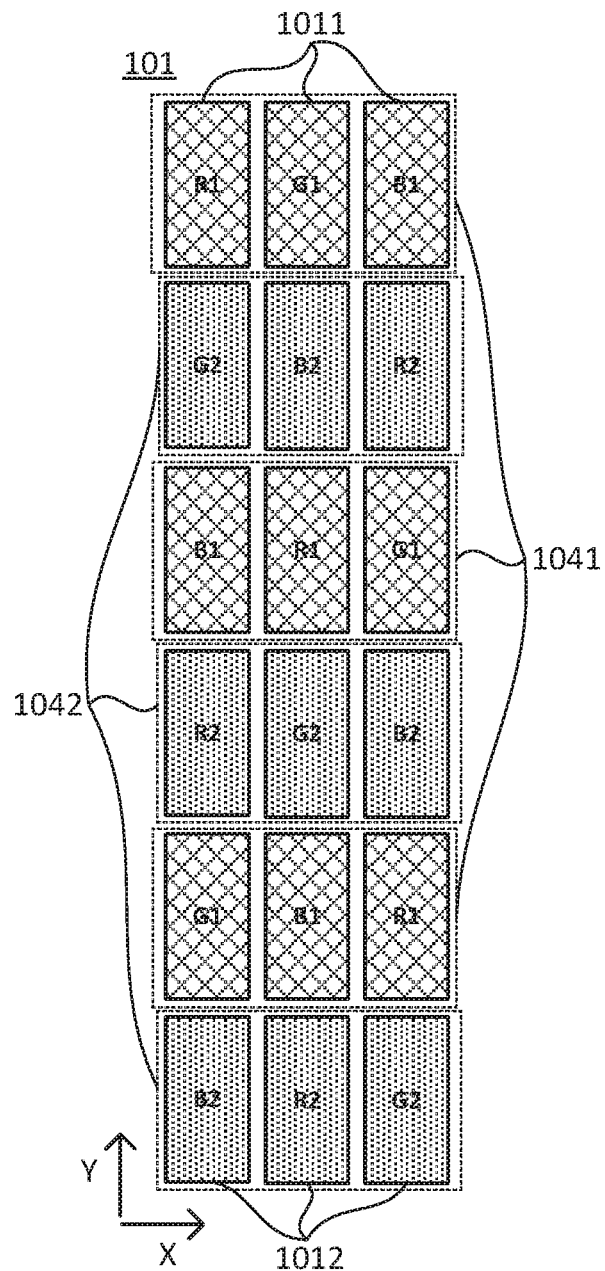
FIG. 7 is a schematic diagram illustrating an arrangement of yet another pixel array of a display panel according to an embodiment of the present disclosure.

Exemplarily, FIG. 7 is a schematic diagram illustrating an arrangement of yet another pixel array of a display panel according to an embodiment of the present disclosure. Referring to FIG. 7, one minimum repeating unit in the pixel array is illustrated. The minimum repeating unit includes three pixel groups 101 arranged in the second direction Y, and each pixel group 101 includes one first pixel group 1041 and one second pixel group 1042. The first pixel group 1041 includes first-type pixel units 1011 arranged in one row in the first direction X and the first-type pixel units 1011 arranged in one row includes N (exemplarily, N=3 in FIG. 7) first sub-pixels with N different emitting colors which are respectively the first red sub-pixel R1, the first green sub-pixel G1 and the first blue sub-pixel B1. The second pixel group 1042 includes second-type pixel units 1012 arranged in one row in the first direction X and the second-type pixel units 1012 arranged in one row includes N (exemplarily, N=3 in FIG. 7) second sub-pixels with N different emitting colors, which are respectively the second red sub-pixel R2, the second green sub-pixel G2 and the second blue sub-pixel B2. In the minimum repeating unit illustrated in FIG. 7, the sub-pixels are arranged in the following manner:
R1 G1 B1
G2 B2 R2
B1 R1 G1
R2 G2 B2
G1 B1 R1
B2 R2 G2

The minimum repeating unit is repeatedly arranged in the first direction X and the second direction Y to form the pixel array.

Figure 8:
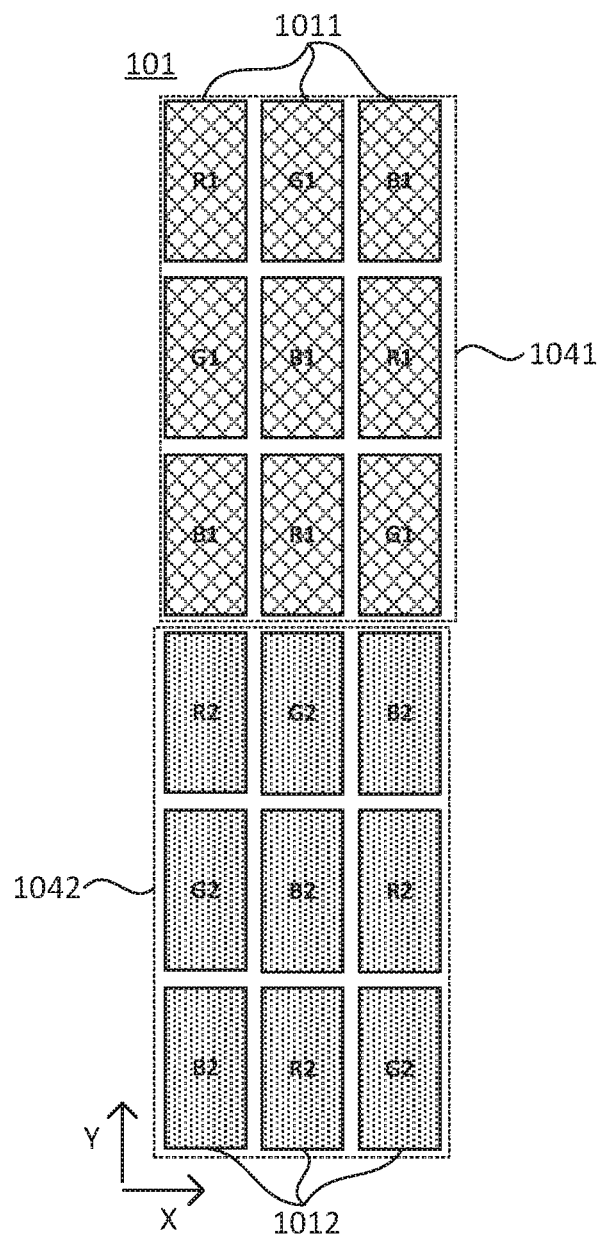
FIG. 8 is a schematic diagram illustrating an arrangement of yet another pixel array of a display panel according to an embodiment of the present disclosure.

Exemplarily, FIG. 8 is a schematic diagram illustrating an arrangement of yet another pixel array of a display panel according to an embodiment of the present disclosure. Referring to FIG. 8, one minimum repeating unit in the pixel array is illustrated. The minimum repeating unit includes one pixel group 101; the pixel group 101 includes one first pixel group 1041 and one second pixel group 1042 arranged in the second direction Y; the first pixel group 1041 includes first-type pixel units 1011 arranged in N rows (exemplarily, N=3 in FIG. 8) in the first direction X and each row of first-type pixel units 1011 includes N (exemplarily, N=3 in FIG. 8) first sub-pixels with N different emitting colors which are respectively the first red sub-pixel R1, the first green sub-pixel G1 and the first blue sub-pixel B1; and the second pixel group 1042 includes second-type pixel units 1012 arranged in N rows (exemplarily, N=3 in FIG. 8) in the first direction X and each row of second-type pixel units 1012 includes N (exemplarily, N=3 in FIG. 8) second sub-pixels with N different emitting colors, which are respectively the second red sub-pixel R2, the second green sub-pixel G2 and the second blue sub-pixel B2. In the minimum repeating unit illustrated in FIG. 8, the sub-pixels are arranged in the following manner:
R1 G1 B1
G1 B1 R1
B1 R1 G1

R2 G2 B2
G2 B2 R2
B2 R2 G2

The minimum repeating unit is repeatedly arranged in the first direction X and the second direction Y to form the pixel array.

In the pixel array formed by the minimum repeating unit illustrated in FIG. 7 or FIG. 8, each row of sub-pixels in the first direction X includes the red sub-pixel, the green sub-pixel and the blue sub-pixel; and each row of sub-pixels in the second direction Y includes the red sub-pixel, the green sub-pixel and the blue sub-pixel. Therefore, the display effect of the display panel 10 may be improved. Meanwhile, two adjacent sub-pixels in the first direction X have different emitting colors and two adjacent sub-pixels in the second direction Y have different emitting colors. In this way, the display panel 10 may have more pixels per inch, thereby achieving the finer display effect of the display panel 10.

Optionally, N=3 and the N different emitting colors are respectively red, green and blue; or N=4 and the N different emitting colors are respectively red, green, blue and white or respectively red, green, blue and yellow.

Exemplarily, the emitting colors of the sub-pixels include red, green and blue so that the display panel 10 may display the color picture. The emitting colors of the sub-pixels include white so that display brightness of the display panel 10 may be improved. The N different emitting colors include yellow to enable the display panel to be applied to specific products (such as TVs, vehicle-mounted head-up displays and industrial displays). During the use of the specific products, the yellow gamut is used frequently; the emitting colors of the sub-pixels include yellow so that a color adjustment process of the specific products (such as TVs, vehicle-mounted head-up displays and industrial displays) may be simplified and the power consumption may be reduced.

Exemplarily, FIG. 5 to FIG. 8 exemplarily illustrate the pixel arrangement when N=3. The pixel arrangement when N=4 will be exemplarily described below by referring to FIG. 9 to FIG. 12.

Figure 9:
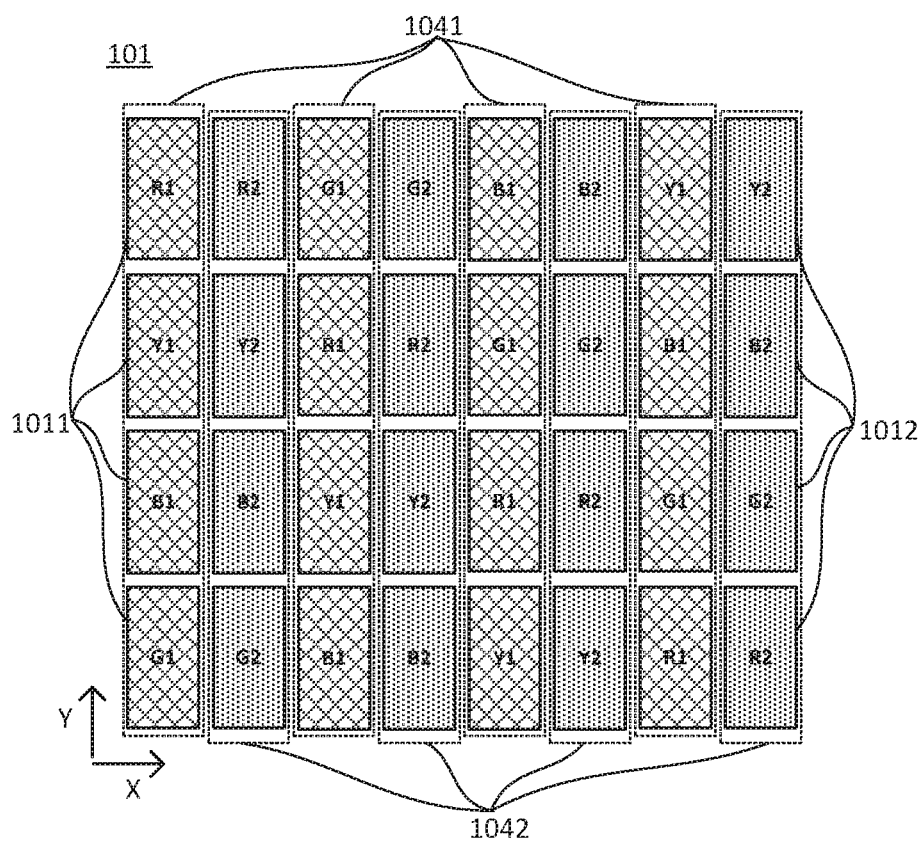
FIG. 9 is a schematic diagram illustrating an arrangement of yet another pixel array of a display panel according to an embodiment of the present disclosure.

Exemplarily, FIG. 9 is a schematic diagram illustrating an arrangement of yet another pixel array of a display panel according to an embodiment of the present disclosure. Referring to FIG. 9, one minimum repeating unit in the pixel array is illustrated. The minimum repeating unit includes four pixel groups 101 arranged in the first direction X, and each pixel group 101 includes one first pixel group 1041 and one second pixel group 1042. The first pixel group 1041 includes four first sub-pixels with four different emitting colors which are respectively the first red sub-pixel R1, the first green sub-pixel G1, the first blue sub-pixel B1 and a first yellow sub-pixel Y1. The second pixel group 1042 includes four second sub-pixels with four different emitting colors, which are respectively the second red sub-pixel R2, the second green sub-pixel G2, the second blue sub-pixel B2 and a second yellow sub-pixel Y2. In the minimum repeating unit illustrated in FIG. 9, the sub-pixels are arranged in the following manner:
R1 R2 G1 G2 B1 B2 Y1 Y2
Y1 Y2 G1 G2 B1 B2 R1 R2
B1 B2 Y1 Y2 R1 R2 G1 G2
G1 G2 B1 B2 Y1 Y2 R1 R2

The minimum repeating unit is repeatedly arranged in the first direction X and the second direction Y to form the pixel array.

Figure 10:
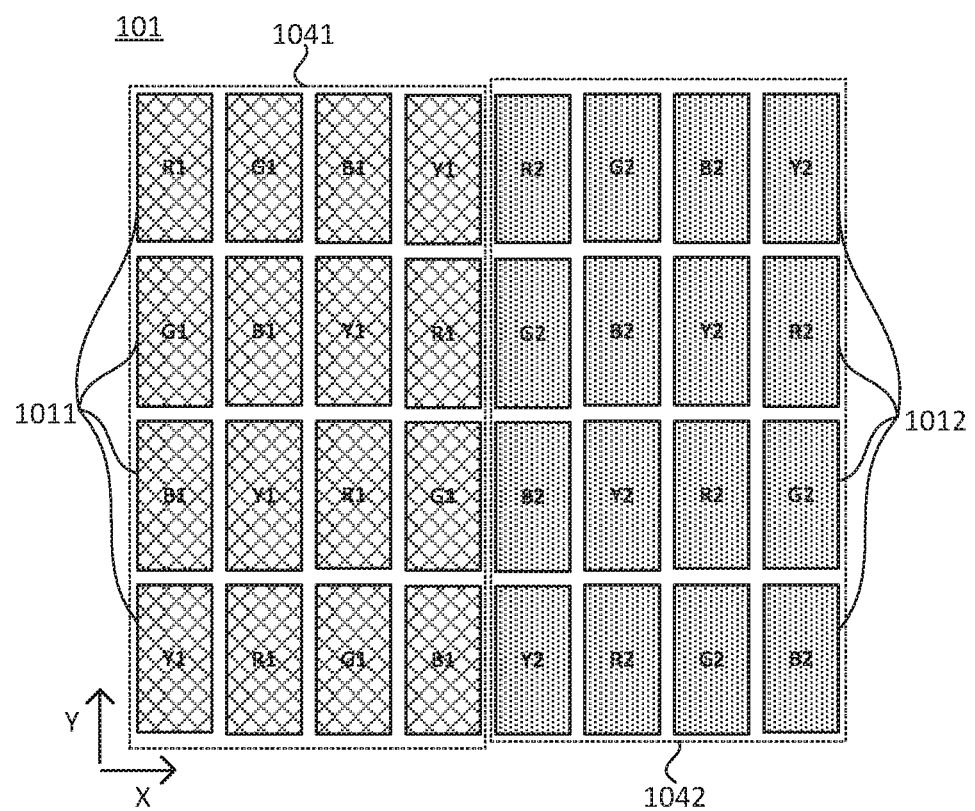
FIG. 10 is a schematic diagram illustrating an arrangement of yet another pixel array of a display panel according to an embodiment of the present disclosure.

Exemplarily, FIG. 10 is a schematic diagram illustrating an arrangement of yet another pixel array of a display panel according to an embodiment of the present disclosure. Referring to FIG. 10, one minimum repeating unit in the pixel array is illustrated. The minimum repeating unit includes one pixel group 101 and the pixel group 101 includes one first pixel group 1041 and one second pixel group 1042 arranged in the first direction X. The first pixel group 1041 includes first-type pixel units 1011 arranged in four rows in the second direction Y and each row of first-type pixel units 1011 includes four first sub-pixels with four different emitting colors which are respectively the first red sub-pixel R1, the first green sub-pixel G1, the first blue sub-pixel B1 and the first yellow sub-pixel Y1. The second pixel group 1042 includes second-type pixel units 1012 arranged in four rows in the second direction Y and each row of second-type pixel units 1012 includes four second sub-pixels with four different emitting colors, which are respectively the second red sub-pixel R2, the second green sub-pixel G2, the second blue sub-pixel B2 and the second yellow sub-pixel Y2. In the minimum repeating unit illustrated in FIG. 10, the sub-pixels are arranged in the following manner:
R1 G1 B1 Y1 R2 G2 B2 Y2
G1 B1 Y1 R1 G2 B2 Y2 R2
B1 Y1 R1 G1 B2 Y2 R2 G2
Y1 R1 G1 B1 Y2 R2 G2 B2

The minimum repeating unit is repeatedly arranged in the first direction X and the second direction Y to form the pixel array.

Figure 11:
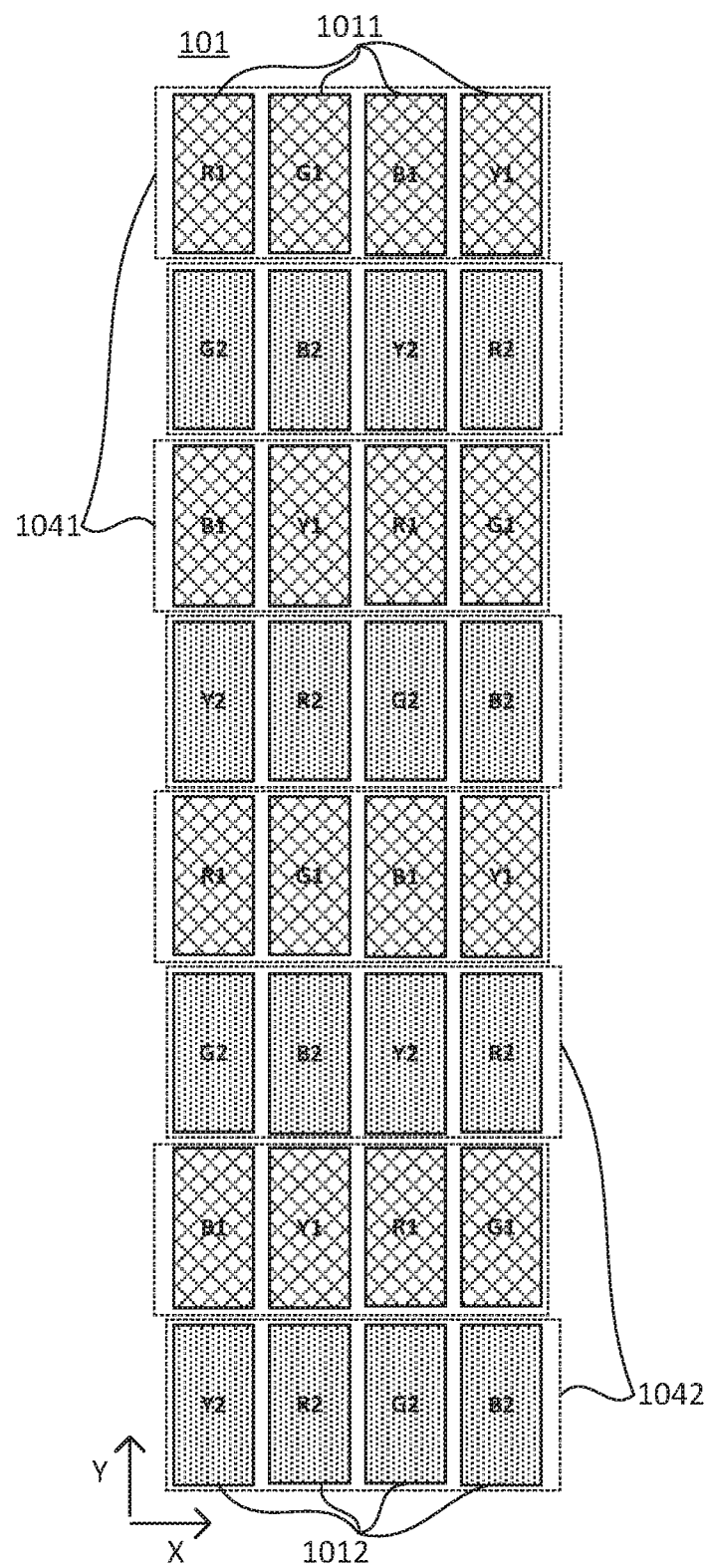
FIG. 11 is a schematic diagram illustrating an arrangement of yet another pixel array of a display panel according to an embodiment of the present disclosure.

Exemplarily, FIG. 11 is a schematic diagram illustrating an arrangement of yet another pixel array of a display panel according to an embodiment of the present disclosure. Referring to FIG. 11, one minimum repeating unit in the pixel array is illustrated. Each minimum repeating unit includes two pixel groups 101 arranged in the second direction Y, and each pixel group 101 includes one first pixel group 1041 and one second pixel group 1042. The first pixel group 1041 includes first-type pixel units 1011 arranged in one row in the first direction X and the first-type pixel units 1011 arranged in one row includes four first sub-pixels with four different emitting colors which are respectively the first red sub-pixel R1, the first green sub-pixel G1, the first blue sub-pixel B1 and the first yellow sub-pixel Y1. The second pixel group 1042 includes second-type pixel units 1012 arranged in one row in the first direction X and the second-type pixel units 1012 arranged in one row includes four second sub-pixels with four different emitting colors, which are respectively the second red sub-pixel R2, the second green sub-pixel G2, the second blue sub-pixel B2 and the second yellow sub-pixel Y2. In the minimum repeating unit illustrated in FIG. 11, the sub-pixels are arranged in the following manner:
R1 G1 B1 Y1
G2 B2 Y2 R2
B1 Y1 R1 G1
Y2 R2 G2 B2

The minimum repeating unit is repeatedly arranged in the first direction X and the second direction Y to form the pixel array.

Figure 12:
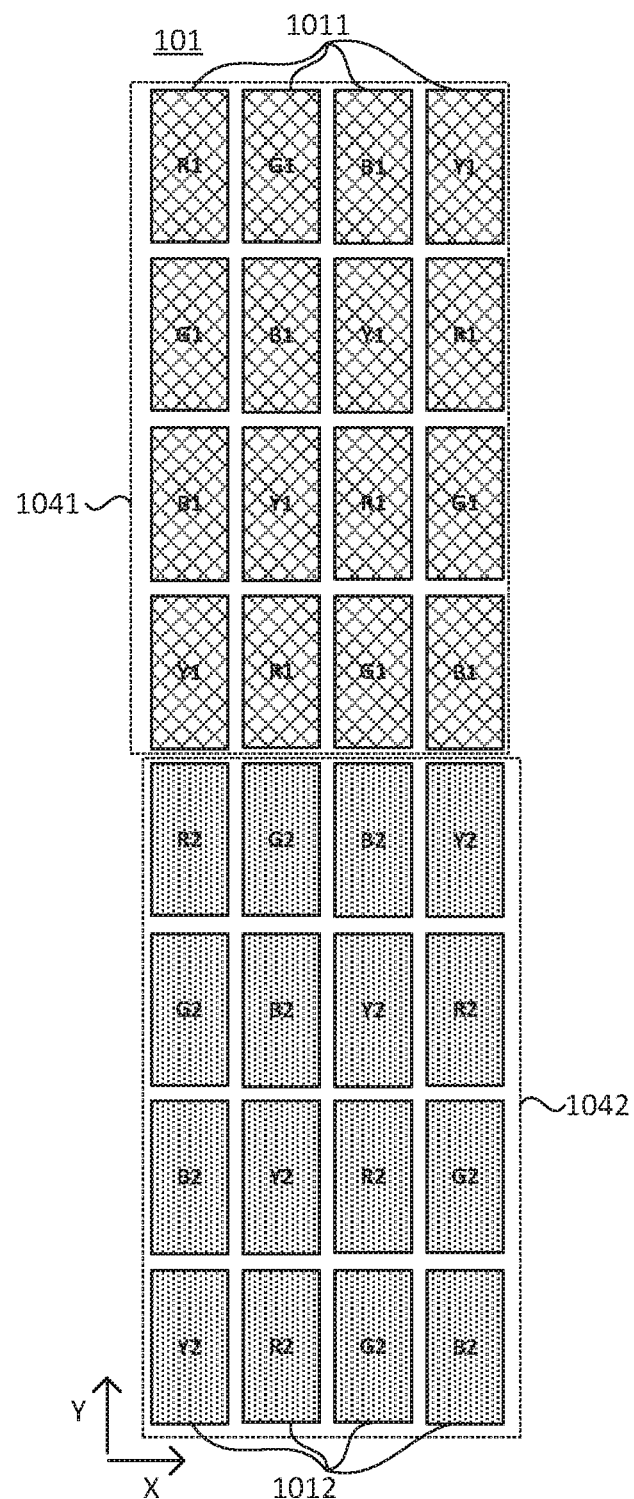
FIG. 12 is a schematic diagram illustrating an arrangement of yet another pixel array of a display panel according to an embodiment of the present disclosure.

Exemplarily, FIG. 12 is a schematic diagram illustrating an arrangement of yet another pixel array of a display panel according to an embodiment of the present disclosure. FIG. 12 illustrates one minimum repeating unit in the pixel array. The minimum repeating unit includes one pixel group 101, and the pixel group 101 includes one first pixel group 1041 and one second pixel group 1042 arranged in the second direction Y. The first pixel group 1041 includes first-type pixel units 1011 arranged in four rows in the first direction X and each row of first-type pixel units 1011 includes four first sub-pixels with four different emitting colors which are respectively the first red sub-pixel R1, the first green sub-pixel G1, the first blue sub-pixel B1 and the first yellow sub-pixel Y1. The second pixel group 1042 includes second-type pixel units 1012 arranged in four rows in the first direction X and each row of second-type pixel units 1012 includes four second sub-pixels with four different emitting colors, which are respectively the second red sub-pixel R2, the second green sub-pixel G2, the second blue sub-pixel B2 and the second yellow sub-pixel Y2. In the minimum repeating unit illustrated in FIG. 12, the sub-pixels are arranged in the following manner:

R1 G1 B1 Y1
G1 B1 Y1 R1
B1 Y1 R1 G1
Y1 R1 G1 B1
R2 G2 B2 Y2
G2 B2 Y2 R2
B2 Y2 R2 G2
Y2 R2 G2 B2

The minimum repeating unit is repeatedly arranged in the first direction X and the second direction Y to form the pixel array.

The structures of the repeating unit in the pixel array illustrated in FIG. 9 to FIG. 12 are similar to the structures of the repeating unit in the pixel array illustrated in FIG. 5 to FIG. 8 and thus have similar technical effects which may be understood by referring to the above description and are not repeated herein.

Firstly, it should be noted that FIG. 9 to FIG. 12 merely exemplarily illustrate that the four different emitting colors are respectively red, green, blue and yellow when N=4; of course, the four different emitting colors may also be red, green, blue and white. In other embodiments, the four different emitting colors may be set to other colors known to those skilled in the art according to the practical requirements of the display panel 10, which is not limited in the embodiments of the present disclosure.

Secondly, it should be noted that FIG. 5 to FIG. 12 merely exemplarily illustrate the pixel arrangements when N=3 or N=4, but they are not to limit the display panel 10 according to the embodiments of the present disclosure. In other embodiments, the value of N may be set to other integers according to the display requirements of the display panel 10, which is not limited in the embodiments of the present disclosure.

In addition, it should be noted that FIG. 5 to FIG. 12 merely exemplarily illustrate that the first pixel group 1041 and the second pixel group 1042 are spaced apart from each other in the first direction X or in the second direction Y, but they are not to limit the display panel 10 according to the embodiments of the present disclosure. In other embodiments, it may be set according to the practical requirements of the display panel 10 that the first pixel group 1041 and the second pixel group 1042 are spaced apart from each other in other directions in a plane determined by the first direction X and the second direction Y, which is not limited in the embodiments of the present disclosure.

In addition, it should be noted that FIG. 1 to FIG. 12 merely exemplarily illustrate the first-type pixel unit and the second-type pixel unit in a rectangular shape, but it is not to limit the shape of the first-type pixel unit and the second-type pixel unit in the display panel 10 according to the embodiments of the present disclosure. In other embodiments, the shape of the first-type pixel unit may also be a circle, a square, a prism, a shape stacked by various shapes and other shapes known to those skilled in the art. The shape of the second-type pixel unit may also be a circle, a square, a prism, a shape stacked by various shapes and other shapes known to those skilled in the art. The first-type pixel units and the second-type pixel units may have the same shape or different shapes. Meanwhile, the first sub-pixels in the first-type pixel unit and the second sub-pixels in the second-type pixel unit may have the same size or different sizes, which are limited in the embodiments of the present disclosure.

In addition, the first sub-pixel and the second sub-pixel of the same color may be made of the same material and may be made of different materials, which may be specifically set according to the processes and the display requirements of the display panel, and it is not limited in the embodiments of the present disclosure.

Figure 13:
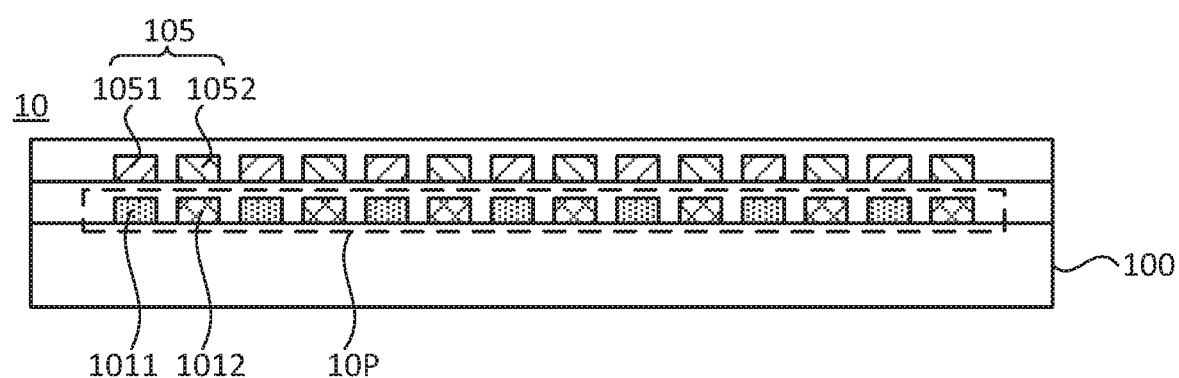
FIG. 13 is a structural diagram of yet another display panel according to an embodiment of the present disclosure.

Optionally, FIG. 13 is a structural diagram of yet another display panel according to an embodiment of the present disclosure. Referring to FIG. 13, the display panel 10 further includes a plurality of polarization units 105 and the polarization unit 105 includes a first polarization unit 1051 and a second polarization unit 1052. The plurality of polarization units 105 are disposed on a side of the pixel array 10P facing away from a base substrate 100. The first polarization unit 1051 is disposed in one-to-one correspondence with the first-type pixel unit 1011 and the second polarization unit 1052 is disposed in one-to-one correspondence with the second-type pixel unit 1012. A polarization direction of the first polarization unit 1051 is perpendicular to a polarization direction of the second polarization unit 1052.

In this way, the display panel 10 may be adopted to achieve a polarized 3D display.

Exemplarily, when the first-type pixel units 1011 display the picture, the first polarization unit 1051 converts a ray emitted by the display panel 10 into a ray parallel to the polarization direction of the first polarization unit 1051. When the second-type pixel units 1012 displays the picture, the second polarizing unit 1052 converts the ray emitted from the display panel 10 into a ray parallel to the polarization direction of the second polarization unit 1052.

It should be noted that the polarized 3D display mode also needs the cooperation of 3D polarized glasses to enable the user to observe a 3D display effect.

Figure 14:
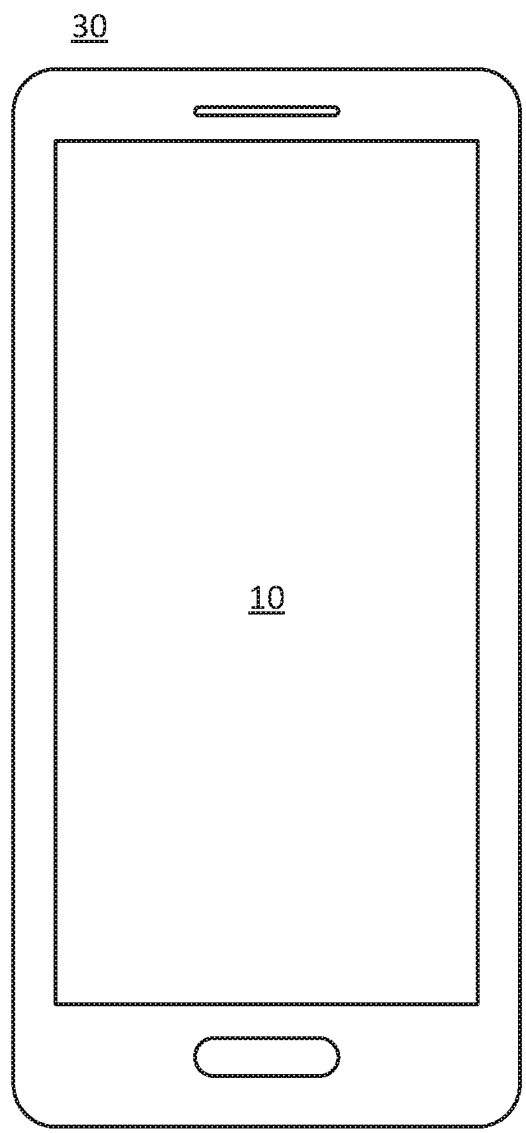
FIG. 14 is a structural diagram of a display device according to an embodiment of the present disclosure.

On the basis of the embodiments described above, the embodiments of the present disclosure further provide a display device. Exemplarily, FIG. 14 is a structural diagram of a display device according to an embodiment of the present disclosure. Referring to FIG. 14, a display device 30 includes the display panel 10 according to the embodiments described above.

The display device 30 according to the embodiments of the present disclosure includes the display panel 10 in the embodiments described above. Therefore, the display device 30 according to the embodiments of the present disclosure also has the beneficial effects described in the above embodiments; details may be referred to the above description and are not repeated herein. Exemplarily, the display device 30 may be a mobile phone, a computer and a smart wearable device or other display devices known to those skilled in the art, which are not limited in the embodiments of the present disclosure.

Figure 15:
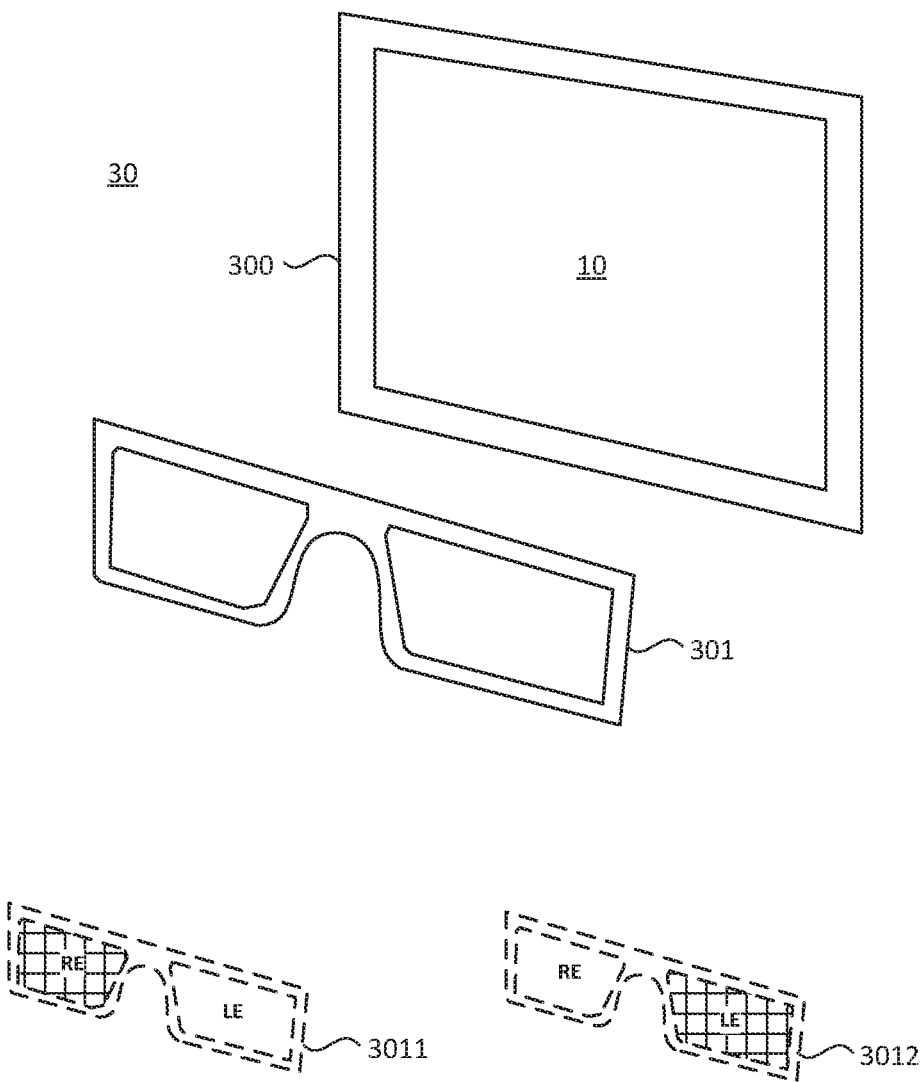
FIG. 15 is a structural diagram of another display device according to an embodiment of the present disclosure.

Optionally, FIG. 15 is a structural diagram of another display device according to an embodiment of the present disclosure. Referring to FIG. 15, the display device 30 may further include 3D shutter glasses 301. The 3D shutter glasses 301 are configured to block the right eye of the user when each first-type pixel unit in the pixel group receives the drive signal within the first time to display the first picture and block the left eye of the user when each second-type pixel unit in the pixel group receives the drive signal within the second time to display the second picture.

The display device 30 includes a display screen 300 and the 3D shutter glasses 301, and the display screen 300 includes the display panel 10 provided by the embodiments described above.

The state of the 3D shutter glasses 301 within the first time and the state of the 3D shutter glasses 301 within the second time may be respectively represented by a first state 3011 and a second state 3012.

Exemplarily, within the first time, each first-type pixel unit receives the drive signal to display the user's left-eye picture; at this time, the 3D shutter glasses 301 are in the first state 3011, that is, a left-eye glass lens LE is light-transmitting and a right-eye glass lens RE is light-proof. Therefore, merely the left eye of the user receives the user's left-eye picture and the right eye of the user does not receive the user's left-eye picture. Within the second time, each second-type pixel unit receives the drive signal to display the user's right-eye picture; at this time, the 3D shutter glasses 301 are in the second state 3012, that is, the left-eye glass lens LE is light-proof and the right-eye glass lens RE is light-transmitting. Therefore, merely the right eye of the user receives the user's right-eye picture and the left eye of the user does not receive the user's right-eye picture. As described above, when the display device 30 is adopted to achieve a 3D shutter display, interference between the user's left-eye picture and user's right-eye picture may be avoided. Meanwhile, the user's left-eye picture is displayed by the first-type pixel unit 1011 and the user's right-eye picture is displayed by the second-type pixel unit 1012. Therefore, it is unnecessary to perform the alternate high-frequency compression on the display picture of the same pixel unit, thereby reducing the technical difficulties, reducing the costs of the display panel 10 and further reducing costs of the display device 30.

Figure 16:
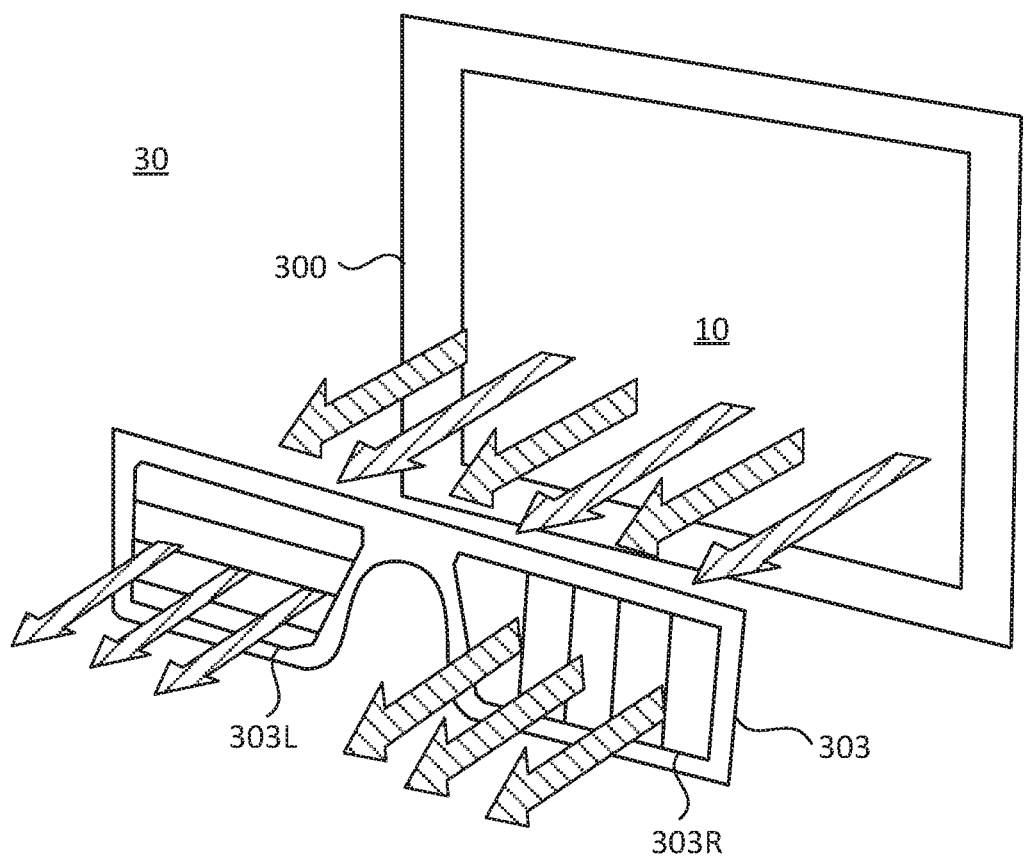
FIG. 16 is a structural diagram of yet another display device according to an embodiment of the present disclosure.

Optionally, FIG. 16 is a structural diagram of yet another display device according to an embodiment of the present disclosure. By combining FIG. 13 and FIG. 16, the display device 30 may further include polarized glasses 303. The display panel 10 includes the plurality of polarization units 105 and each polarization unit 105 includes the first polarization unit 1051 and the second polarization unit 1052. The plurality of polarization units 105 are disposed on one side of the pixel array 10P facing away from the base substrate 100. The first polarization unit 1051 is disposed in one-to-one correspondence with the first-type pixel unit 1011 and the second polarization unit 1052 is disposed in one-to-one correspondence with the second-type pixel unit 1012. The polarization direction of the first polarization unit 1051 is perpendicular to the polarization direction of the second polarization unit 1052. A left-eye glass lens 303L of the polarized glasses 303 is parallel to the polarization direction of the first polarization unit 1051 and a right-eye glass lens 303R of the polarized glasses 303 is parallel to the polarization direction of the second polarization unit 1052.

The display device 30 includes the display screen 300 and the polarized glasses 303, and the display screen 300 includes the display panel 10 according to the embodiments described above.

In so doing merely the ray parallel to the polarization direction of the first polarization unit 1051 passes through the left-eye glass lens 303L of the polarized glasses 303 and merely the ray parallel to the polarization direction of the second polarization unit 1052 passes through the right-eye glass lens 303R of the polarized glasses 303. Therefore, within one-frame time, the left eye and the right eye of the user may respectively receive two pictures with perpendicular polarization directions which are combined in the user's visual center to form the stereoscopic picture so that the display device 30 may be adopted to achieve the polarized 3D display.

Based on the same inventive concept, the embodiments of the present disclosure further provide a display method of the display panel. The display method may be executed by any display panel 10 according to the embodiments described above. Therefore, the display method also has the beneficial effects of the display panel according to the embodiments described above and details may be referred to the above description of the display panel and are not repeated herein.

Figure 17:
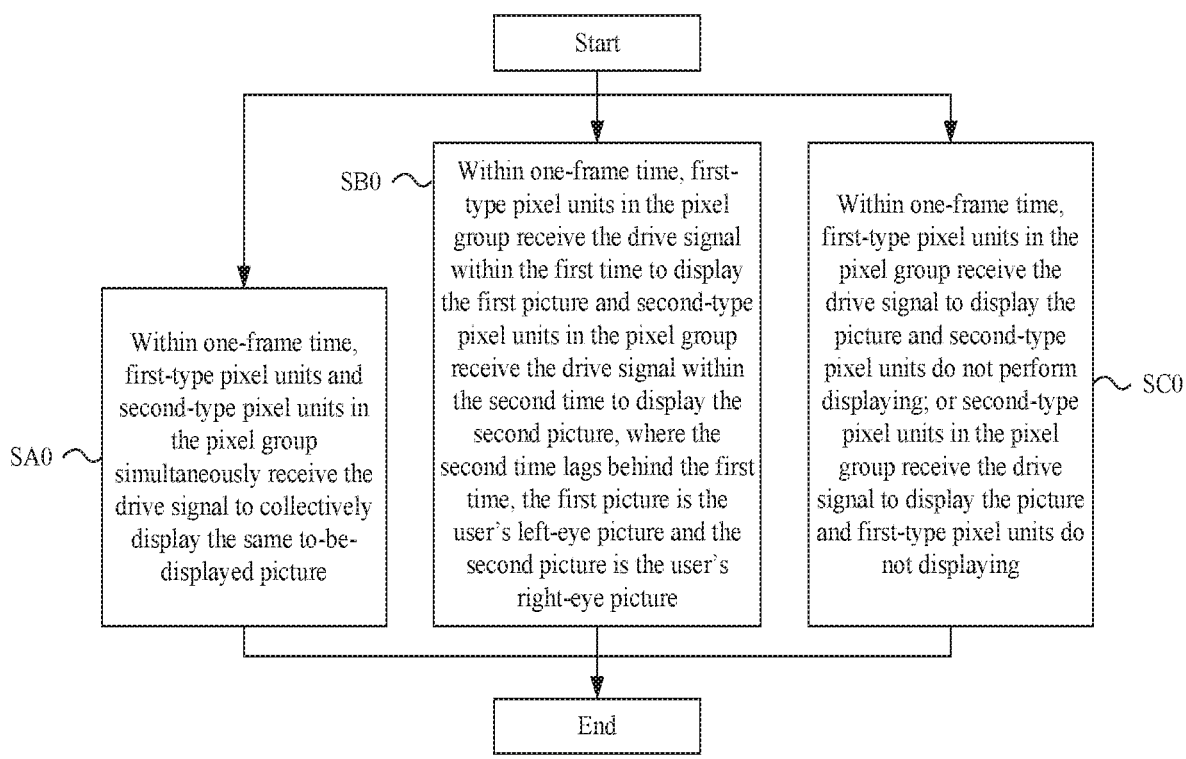
FIG. 17 is a flowchart of a display method of a display panel according to an embodiment of the present disclosure.

Exemplarily, FIG. 17 is a flowchart of a display method of a display panel according to an embodiment of the present disclosure. Referring to FIG. 17, the display method of the display panel includes any one of the three steps described below.

In SA0, within one-frame time, first-type pixel units and second-type pixel units in the pixel group simultaneously receive the drive signal to collectively display the same to-be-displayed picture within one-frame time.

This step may be referred to as a first display manner of the display panel corresponding to the first display mode of the display panel and favorable to increase the pixels per inch of the display panel, thereby achieving the high-definition display of the display picture.

In SB0, within one-frame time, first-type pixel units in the pixel group receive the drive signal within the first time to display the first picture and second-type pixel units in the pixel group receive the drive signal within the second time to display the second picture, where the second time lags behind the first time, the first picture is the user's left-eye picture and the second picture is the user's right-eye picture.

This step may be referred to as a second display manner of the display panel corresponding to the second display mode of the display panel. In this display manner, the user's left-eye picture and the user's right-eye picture may be respectively displayed by two types of pixel units. Therefore, it is unnecessary to perform the alternate high-frequency compression on the display picture of the same pixel unit, thereby reducing technical difficulties and reducing costs of the display panel.

In SC0, within one-frame time, first-type pixel units in the pixel group receive the drive signal to display the picture and second-type pixel units do not perform displaying; or second-type pixel units in the pixel group receive the drive signal to display a picture and first-type pixel units do not perform displaying.

This step may be referred to as a third display manner of the display panel corresponding to the third display mode of the display panel. In this display manner, merely the first-type pixel unit or merely the second-type pixel unit in the display panel may be adopted to receive the drive signal to display the picture and the other type of pixel units does not work, which may reduce the power consumption of the display panel and facilitate power saving and energy saving.

Figure 18:
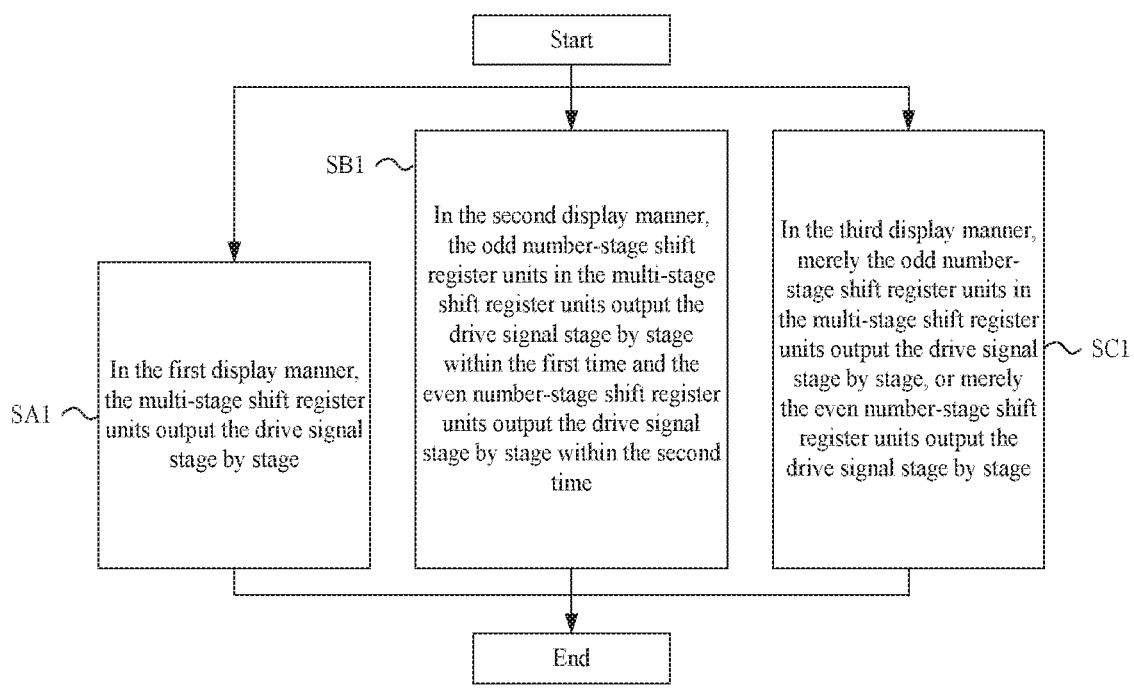
FIG. 18 is a flowchart of another display method of a display panel according to an embodiment of the present disclosure.

Optionally, FIG. 18 illustrates another display method of a display panel according to an embodiment of the present disclosure. By combining FIG. 2 and FIG. 18, the drive circuit 102 of the display panel 10 includes the multi-stage shift register units connected in cascade, the first-type pixel unit 1011 is connected to a respective one of the odd number-stage shift register units 102S in the multi-stage shift register units and the second-type pixel unit 1012 is connected to a respective one of the even number-stage shift register units 102D in the multi-stage shift register units. Based on the structure of the display panel 10 illustrated in FIG. 2, the display method of the display panel illustrated in FIG. 18 may include SA1, SB1 or SC1.

In SA1, in the first display manner, the multi-stage shift register units output the drive signal stage by stage.

In this step, outputting the drive signal stage by stage may be understood as that each stage of shift register units drives the first-type pixel units and the second-type pixel units stage by stage so that the first-type pixel unit and the second-type pixel unit collectively display the same to-be-displayed picture and the display panel may achieve the high-definition display.

In SB1, in the second display manner, the odd number-stage shift register unit in the multi-stage shift register units output the drive signal stage by stage within the first time and the even number-stage shift register units output the drive signal stage by stage within the second time.

In this step, within the first time, the odd number-stage shift register units output the drive signal to the first-type pixel units stage by stage to enable the first-type pixel units to display the user's left-eye picture; within the second time, the even number-stage shift register units output the drive signal to the second-type pixel units stage by stage to enable the second-type pixel units to display the user's right-eye picture; and the display panel may achieve the 3D shutter display.

In SC1, in the third display manner, merely the odd number-stage shift register units in the multi-stage shift register units output the drive signal stage by stage, or merely the even number-stage shift register units output the drive signal stage by stage.

In this step, merely the odd number-stage shift register units output the drive signal to the first-type pixel units stage by stage to enable the first-type pixel units to display a certain to-be-displayed picture; or merely the even number-stage shift register units output the drive signal to the second-type pixel units stage by stage to enable the second-type pixel units to display a certain to-be-displayed picture. In this way, merely one type of pixel units may be adopted to receive the drive signal to display the picture and the other type of pixel units does not work, which is favorable to reduce the power consumption of the display panel and facilitate power saving and energy saving.

Figure 19:
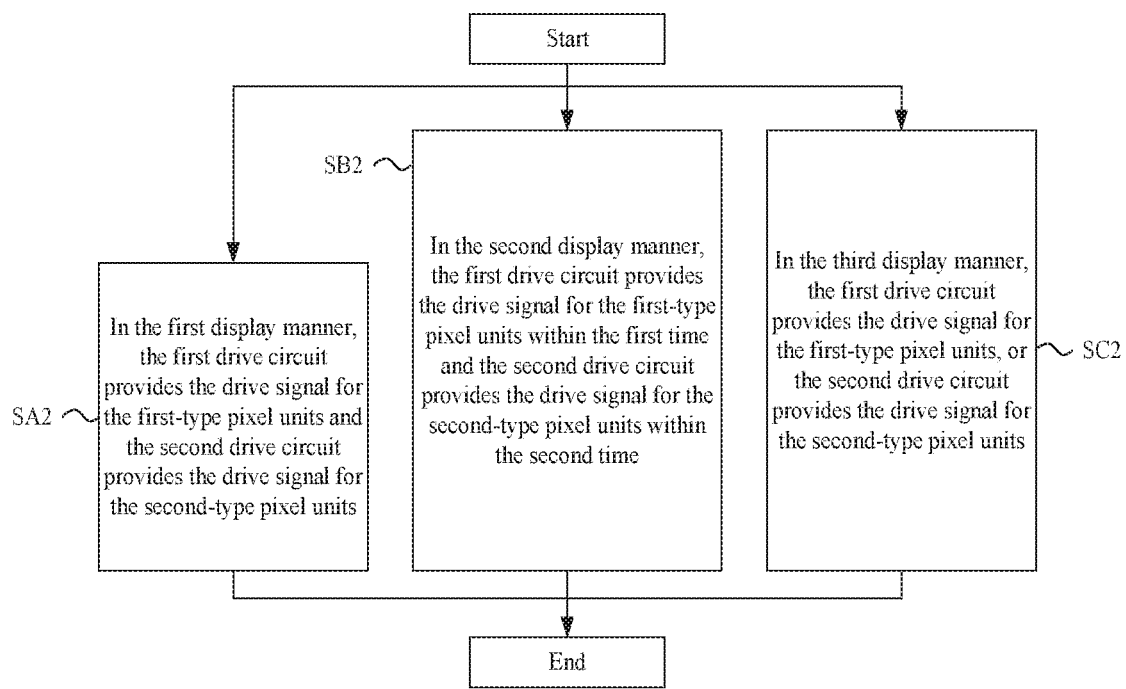
FIG. 19 is a flowchart of yet another display method of a display panel according to an embodiment of the present disclosure.

Optionally, FIG. 19 is a flowchart of yet another display method of a display panel according to an embodiment of the present disclosure. By combining FIG. 3 and FIG. 19, the drive circuit of the display panel 10 includes the first drive circuit and the second drive circuit; the first drive circuit is electrically connected to the first-type pixel units and the second drive circuit is electrically connected to the second-type pixel units. Based on the structure of the display panel illustrated in FIG. 3, the display method of the display panel illustrated in FIG. 19 may include SA2, SB2 or SC2.

In SA2, in the first display manner, the first drive circuit provides the drive signal for the first-type pixel units and the second drive circuit provides the drive signal for the second-type pixel units.

In this step, the first-type pixel units and the second-type pixel units may be adopted to collectively display the same to-be-displayed picture, thereby achieving the high-definition display of the display panel.

In SB2, in the second display manner, the first drive circuit provides the drive signal for the first-type pixel units within the first time and the second drive circuit provides the drive signal for the second-type pixel units within the second time.

In this step, the first-type pixel units may be adopted to display the user's left-eye picture within the first time and the second-type pixel units may be adopted to display the user's right-eye picture within the second time, thereby achieving the 3D shutter display of the display panel.

In SC2, in the third display manner, the first drive circuit provides the drive signal for the first-type pixel units, or the second drive circuit provides the drive signal for the second-type pixel units.

In this step, the first-type pixel units or the second-type pixel units may be adopted to display a certain to-be-displayed picture and the other type of pixel units does not work, thereby achieving power saving display of the display panel.

Optionally, FIG. 20 is a timing diagram of a drive signal in a third display manner of a display panel according to an embodiment of the present disclosure. Referring to FIG. 20, the first time is not overlapped with the second time.

Exemplarily, a first drive signal V01 represents a drive signal provided by the drive circuit for the first-type pixel unit and a second drive signal V02 represents a drive signal provided by the drive circuit for the second-type pixel unit. It is set that the first-type pixel unit and the second-type pixel unit work in the case of a logic high-level drive signal and do not work in the case of a logic low-level drive signal. Within the first time T1, the first-type pixel unit receives the logic high-level drive signal to display the user's left-eye picture and the second-type pixel units receive the logic low-level drive signal and dot not perform displaying; within the second time T2, the second-type pixel unit receives the logic high-level drive signal to display the user's right-eye picture and the first-type pixel units receive the logic low-level signal and dot not perform displaying.

In this way, by setting that the first time T1 does not overlap the second time T2, the user's left-eye picture and the user's right-eye picture may be alternately displayed, thereby achieving the 3D shutter display of a 3D display panel and simultaneously avoiding the interference between the user's left-eye picture and the user's right-eye picture to ensure the better 3D display effect of the display panel.

Figure 21:
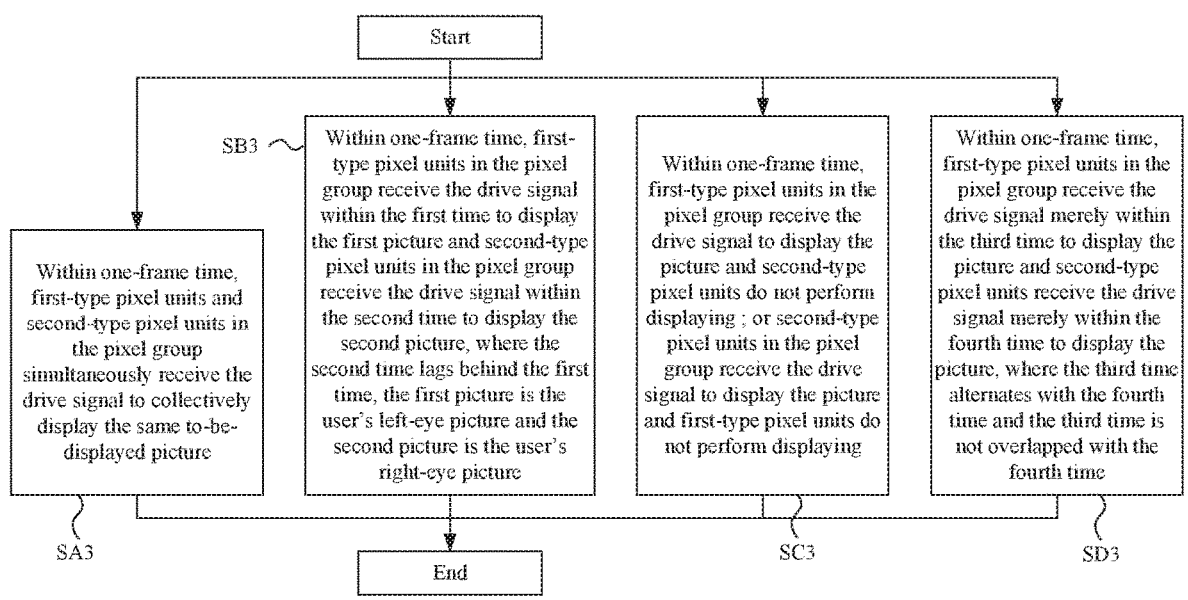
FIG. 21 is a flowchart of yet another display method of a display panel according to an embodiment of the present disclosure.

Optionally, FIG. 21 is a flowchart of yet another display method of a display panel according to an embodiment of the present disclosure. Referring to FIG. 21, the display method of the display panel may further include SA3, SB3, SC3 or SD3.

In SA3, within one-frame time, first-type pixel units and second-type pixel units in the pixel group simultaneously receive the drive signal to collectively display the same to-be-displayed picture.

In SB3, within one-frame time, first-type pixel units in the pixel group receive the drive signal within the first time to display the first picture and second-type pixel units in the pixel group receive the drive signal within the second time to display the second picture, where the second time lags behind the first time, the first picture is the user's left-eye picture and the second picture is the user's right-eye picture.

In SC3, within one-frame time, first-type pixel units in the pixel group receive the drive signal to display the picture and second-type pixel units do not perform displaying; or second-type pixel units in the pixel group receive the drive signal to display the picture and first-type pixel units do not perform displaying.

In SD3, within one-frame time, first-type pixel units in the pixel group receive the drive signal merely within the third time to display the picture and second-type pixel units receive the drive signal merely within the fourth time to display a picture, where the third time alternates with the fourth time and the third time is not overlapped with the fourth time.

This step may be referred to as a fourth display manner of the display panel corresponding to the first display mode of the display panel and favorable to reduce the power consumption of the display panel and facilitate power saving and energy saving.

Figure 22:
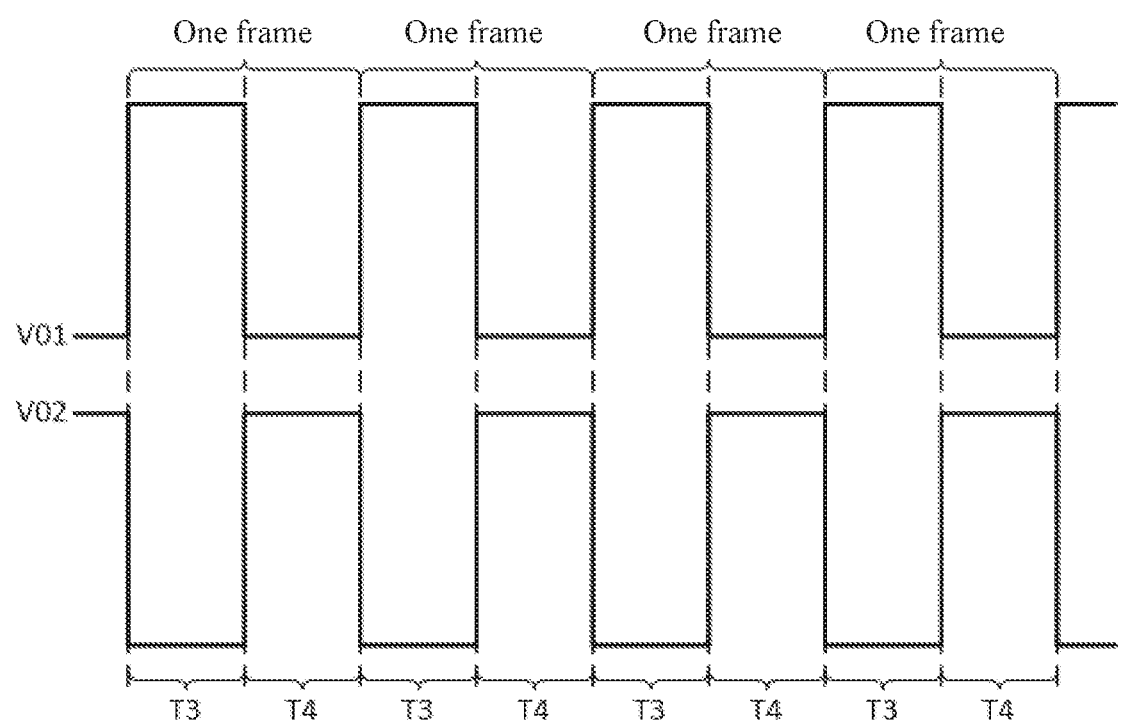
FIG. 22 is a timing diagram of a drive signal in a fourth display manner of a display panel according to an embodiment of the present disclosure.

Exemplarily, FIG. 22 is a timing diagram of a drive signal in a fourth display manner of a display panel according to an embodiment of the present disclosure. Referring to FIG. 22, the first drive signal V01 represents the drive signal provided by the drive circuit for the first-type pixel unit and the second drive signal V02 represents the drive signal provided by the drive circuit for the second-type pixel unit. It is set that the first-type pixel unit and the second-type pixel unit work in the case of the logic high-level drive signal and do not work in the case of the logic low-level drive signal. Within the third time T3, the first-type pixel unit receives the logic high-level drive signal to display the user's left-eye picture and the second-type pixel units receive the logic low-level drive signal and dot not perform displaying; within the fourth time T4, the second-type pixel unit receives the logic high-level drive signal to display the user's right-eye picture and the first-type pixel units receive the logic low-level signal and dot not perform displaying.

In this way, by setting that the third time T3 alternates with the fourth time T4 and the third time T3 does not overlap the fourth time T4, the first-type pixel units and the second-type pixel units may alternately display a to-be-displayed picture within one-frame time, thereby ensuring picture display continuity and balancing the losses of the first-type pixel units and the second-type pixel units. In this way, the first-type pixel units and the second-type pixel units may have equal service lives, thereby enabling the display panel to have a longer service life.

It should be noted that FIG. 20 and FIG. 22 only exemplarily illustrate that the first-type pixel units and the second-type pixel units both work in the case of the logic high-level drive signal and do not work in the case of the logic low-level drive signal, but it is not to limit the display panel according to the embodiments of the present disclosure. In other embodiments, it may be set according to the practical requirements of the display panel that the first-type pixel unit and the second-type pixel unit work in the case of the logic low-level drive signal; or the first-type pixel unit works in the case of the logic low-level drive signal and the second-type pixel unit works in the case of the logic high-level drive signal; or other settings may be adopted, which are not limited in the embodiments of the present disclosure.

It is to be noted that the above are only preferred embodiments of the present disclosure and the technical principles used therein. It will be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising:
a pixel array, wherein the pixel array comprises a plurality of pixel groups; and
each of the plurality of pixel groups comprises first-type pixel units and second-type pixel units; and
a drive circuit, configured to provide a drive signal for the pixel array;
wherein a display mode of the display panel comprises:
a first display mode in which within one-frame time, the first-type pixel units and the second-type pixel units in the each of the plurality of pixel groups simultaneously receive the drive signal to collectively display a same to-be-displayed picture, and the display panel is in the first display mode;
a second display mode in which within one-frame time, the first-type pixel units in the each of the plurality of pixel groups receive the drive signal within first time to display a first picture and the second-type pixel units in the each of the plurality of pixel groups receive the drive signal within second time to display a second picture, wherein the second time lags behind the first time, the first picture is a user's left-eye picture, the second picture is a user's right-eye picture, and the display panel is in the second display mode which is a stereoscopic display mode; and
a third display mode in which within one-frame time, the first-type pixel units in the each of the plurality of pixel groups receive the drive signal to display a picture and the second-type pixel units do not perform displaying; or the second-type pixel unit in the each of the plurality of pixel groups receive the drive signal to display a picture and the first-type pixel units do not performing displaying, and the display panel is in the third display mode.

2. The display panel of claim 1, wherein the drive circuit comprises multi-stage shift register units connected in cascade; wherein each of the first-type pixel units is connected to a respective one of odd number-stage shift register units in the multi-stage shift register units, and each of the second-type pixel units is connected to a respective one of even number-stage shift register units in the multi-stage shift register units; and
wherein in the first display mode, the multi-stage shift register units output the drive signal stage by stage;
in the second display mode, the odd number-stage shift register units in the multi-stage shift register units output the drive signal stage by stage within the first time and the even number-stage shift register units output the drive signal stage by stage within the second time; and
in the third display mode, merely the odd number-stage shift register units in the multi-stage shift register units output the drive signal stage by stage, or merely the even number-stage shift register units output the drive signal stage by stage.

3. The display panel of claim 1, wherein the drive circuit comprises a first drive circuit and a second drive circuit, wherein the first drive circuit is connected to the first-type pixel units and provides the drive signal for the first-type pixel units, and the second drive circuit is connected to the second-type pixel units and provides the drive signal for the second-type pixel units.

4. The display panel of claim 1, wherein when the display panel is in the second display mode, the first time is not overlapped with the second time.

5. The display panel of claim 1, wherein the display mode of the display panel further comprises:

a fourth display mode in which within one-frame time, the first-type pixel units in the each of the plurality of pixel groups receives the drive signal merely within third time to display a picture and the second-type pixel units receives the drive signal merely within fourth time to display a picture; wherein the third time alternates with the fourth time and is not overlapped with the fourth time, and the display panel is in the fourth display mode.

6. The display panel of claim 1, wherein in the pixel array, the plurality of pixel groups are repeatedly arranged in a first direction and a second direction, wherein the first direction intersects the second direction.

7. The display panel of claim 6, wherein the each of the plurality of pixel groups comprises a first pixel group and a second pixel group, the first pixel group comprises the first-type pixel units, and the second pixel group comprises the second-type pixel units.

8. The display panel of claim 7, wherein in the each of the plurality of pixel groups, each of the first-type pixel units comprises first sub-pixels with N different emitting colors and each of the second-type pixel units comprises second sub-pixels with N different emitting colors, wherein N is a positive integer greater than or equal to 3.

9. The display panel of claim 8, wherein in the each of the plurality of pixel groups, the first pixel group is spaced apart from the second pixel group in the first direction.

10. The display panel of claim 9, wherein the first pixel group comprises the first-type pixel units arranged in one row in the second direction, and the first-type pixel units in the one row comprises N first sub-pixels with the N different emitting colors; and the second pixel group comprises the second-type pixel units arranged in one row in the second direction, and the second-type pixel units in the one row comprises N second sub-pixels with the N different emitting colors.

11. The display panel of claim 10, wherein in the first direction, one of the first sub-pixels has a same emitting color as one of the second sub-pixels adjacent to the one of the first sub-pixels, two adjacent first sub-pixels have different emitting colors, and two adjacent second sub-pixels have different emitting colors.

12. The display panel of claim 9, wherein in the each of the plurality of pixel groups, the first pixel group comprises the first-type pixel units arranged in N rows in the second direction and each row of the first-type pixel units among the N rows of the first-type pixel units comprise the first sub-pixels with the N different emitting colors; and the second pixel group comprises the second-type pixel units arranged in N rows in the second direction and each row of the second-type pixel units among the second-type pixel units arranged in N rows comprise the second sub-pixels with the N different emitting colors.

13. The display panel of claim 9, wherein in the first direction, two adjacent sub-pixels have different emitting colors;

wherein the sub-pixels comprise the first sub-pixels and the second sub-pixels.

14. The display panel of claim 8, wherein N=3 and the N different emitting colors are respectively red, green and blue; or N=4, and the N different emitting colors are respectively red, green, blue and white, or are respectively red, green, blue and yellow.

15. The display panel of claim 1, further comprising a plurality of polarization units, wherein each of the plurality of polarization units comprise a first polarization unit and a second polarization unit;

the plurality of polarization units are disposed on a side of the pixel array facing away from a base substrate;

the first polarization unit is disposed in one-to-one correspondence with one of the first-type pixel units and the second polarization unit is disposed in one-to-one correspondence with one of the second-type pixel units; and a polarization direction of the first polarization unit is perpendicular to a polarization direction of the second polarization unit.

16. A display device, comprising a display panel, wherein the display panel comprises:

a pixel array, wherein the pixel array comprises a plurality of pixel groups; and each of the plurality of pixel groups comprises first-type pixel units and second-type pixel units; and a drive circuit, configured to provide a drive signal for the pixel array;

wherein a display mode of the display panel comprises:

a first display mode in which within one-frame time, the first-type pixel units and the second-type pixel units in the each of the plurality of pixel groups simultaneously receive the drive signal to collectively display a same to-be-displayed picture, and the display panel is in the first display mode;

a second display mode in which within one-frame time, the first-type pixel units in the each of the plurality of pixel groups receive the drive signal within first time to display a first picture and the second-type pixel units in the each of the plurality of pixel groups receive the drive signal within second time to display a second picture, wherein the second time lags behind the first time, the first picture is a user's left-eye picture, the second picture is a user's right-eye picture, and the display panel is in the second display mode which is a stereoscopic display mode; and a third display mode in which within one-frame time, the first-type pixel units in the each of the plurality of pixel groups receive the drive signal to display a picture and the second-type pixel units do not perform displaying; or the second-type pixel unit in the each of the plurality of pixel groups receive the drive signal to display a picture and the first-type pixel units do not performing displaying, and the display panel is in the third display mode.

17. The display device of claim 16, further comprising: 3D shutter glasses;

wherein the 3D shutter glasses are configured to block a right eye of a user when each of the first-type pixel units in a pixel group receives a drive signal within first time to display a first picture and block a left eye of the user when each of the second-type pixel units in the pixel group receives the drive signal within second time to display a second picture.

18. The display device of claim 16, further comprising: polarized glasses;

wherein the display panel comprises a plurality of polarization units, wherein each of the plurality of polarization units comprises a first polarization unit and a second polarization unit, the plurality of polarization units are disposed on a side of the pixel array facing away from a base substrate, the first polarization unit is disposed in one-to-one correspondence with one of the first-type pixel units and the second polarization unit is disposed in one-to-one correspondence with one of the second-type pixel units, and a polarization direction of the first polarization unit is perpendicular to a polarization direction of the second polarization unit; and wherein a left-eye glass lens of the polarized glasses is parallel to the polarization direction of the first polarization unit and a right-eye glass lens of the polarized glasses is parallel to the polarization direction of the second polarization unit.

19. A display method of a display panel, executed by a display panel, wherein the display panel comprises:

a pixel array, wherein the pixel array comprises a plurality of pixel groups; and each of the plurality of pixel groups comprises first-type pixel units and second-type pixel units; and a drive circuit, configured to provide a drive signal for the pixel array;

wherein a display mode of the display panel comprises:

a first display mode in which within one-frame time, the first-type pixel units and the second-type pixel units in the each of the plurality of pixel groups simultaneously receive the drive signal to collectively display a same to-be-displayed picture, and the display panel is in the first display mode;

a second display mode in which within one-frame time, the first-type pixel units in the each of the plurality of pixel groups receive the drive signal within first time to display a first picture and the second-type pixel units in the each of the plurality of pixel groups receive the drive signal within second time to display a second picture, wherein the second time lags behind the first time, the first picture is a user's left-eye picture, the second picture is a user's right-eye picture, and the display panel is in the second display mode which is a stereoscopic display mode; and a third display mode in which within one-frame time, the first-type pixel units in the each of the plurality of pixel groups receive the drive signal to display a picture and the second-type pixel units do not perform displaying; or the second-type pixel unit in the each of the plurality of pixel groups receive the drive signal to display a picture and the first-type pixel units do not performing displaying, and the display panel is in the third display mode, the display method comprises:

performing, by first-type pixel units and second-type pixel units, a display under drive of a drive circuit in any one of the following display manners:

a first display manner in which within one-frame time, the first-type pixel units and the second-type pixel units in a pixel group simultaneously receive a drive signal to collectively display a same to-be-displayed picture;

a second display manner in which within one-frame time, the first-type pixel units in the pixel group receive the drive signal within first time to display a first picture and the second-type pixel units in the pixel group receive the drive signal within second time to display a second picture, wherein the second time lags behind the first time, the first picture is a user's left-eye picture and the second picture is a user's right-eye picture; and a third display manner in which within one-frame time, the first-type pixel units in the pixel group receive the drive signal to display a picture and the second-type pixel units does not perform displaying; or the second-type pixel units in the pixel group receive the drive signal to display a picture and the first-type pixel units do not perform displaying.

20. The display method of the display panel of claim 19, wherein the drive circuit comprises multi-stag shift register units connected in cascade, wherein each of the first-type pixel units is connected to a respective one of odd number-stage shift register units in the multi-stage shift register units and each of the second-type pixel units is connected to a respective one of even number-stage shift register units in the multi-stage shift register units; and wherein the display method comprises:

outputting, by the multi-stage shift register units, the drive signal stage by stage in the first display manner;

outputting, by the odd number-stage shift register units in the multi-stage shift register units, the drive signal stage by stage within the first time and outputting, by the even number-stage shift register units, the drive signal stage by stage within the second time in the second display manner; and outputting, by merely the odd number-stage shift register units in the multi-stage shift register units, the drive signal stage by stage, or outputting, by merely the even number-stage shift register units, the drive signal stage by stage in the third display manner.

* * * * *